US012290478B2

(12) United States Patent
Hoel et al.

(10) Patent No.: US 12,290,478 B2
(45) Date of Patent: May 6, 2025

(54) SYSTEM, APPARATUS AND METHOD FOR SUPPORTING AND/OR POSITIONING A PATIENT BEFORE, DURING, OR AFTER A MEDICAL PROCEDURE

(71) Applicant: Mizuho OSI, Union City, CA (US)

(72) Inventors: Stephen Hoel, Hayward, CA (US);
Peter E. Wagner, Danville, CA (US);
Gregory F. Hirth, Pleasanton, CA (US); Charles S. Ladd, Fremont, CA (US)

(73) Assignee: Mizuho OSI, Union City, CA (US)

( * ) Notice: Subject to any disclaimer, the term of this patent is extended or adjusted under 35 U.S.C. 154(b) by 69 days.

(21) Appl. No.: 17/468,083

(22) Filed: Sep. 7, 2021

(65) Prior Publication Data

US 2021/0401653 A1    Dec. 30, 2021

Related U.S. Application Data

(63) Continuation of application No. 17/200,267, filed on Mar. 12, 2021, which is a continuation of application
(Continued)

(51) Int. Cl.
*A61G 13/10* (2006.01)
*A61G 13/06* (2006.01)
*B60B 33/00* (2006.01)

(52) U.S. Cl.
CPC .......... *A61G 13/104* (2013.01); *A61G 13/06* (2013.01); *B60B 33/0018* (2013.01);
(Continued)

(58) Field of Classification Search
CPC .. A61G 13/104; A61G 13/06; A61G 2203/10; A61G 2203/32; A61G 2203/44;
(Continued)

(56) References Cited

U.S. PATENT DOCUMENTS 3,281,141 A    10/1966 Smiley et al.
5,528,782 A *   6/1996 Pfeuffer ................. A61G 13/04
                                                    5/607
(Continued)

FOREIGN PATENT DOCUMENTS

DE          10349918       5/2005
DE       102014115901 A1   5/2016
(Continued)

OTHER PUBLICATIONS

Operating Instructions—Operating Table System Magnus, Maquet 2007.
(Continued)

*Primary Examiner* — Myles A Throop
(74) *Attorney, Agent, or Firm* — Reed Smith LLP; Matthew P. Frederick; Anupma Sahay

(57) ABSTRACT

A system for supporting or positioning a patient before, during, or after a medical procedure can include a platform configured to support at least a portion of a patient. A support column can be positioned beneath the platform. A base can be positioned beneath the support column and configured to support the support column. The base can include at least one drive wheel configured to contact a ground surface and move the platform with respect to the ground surface. A drive assist user interface module can be operatively connected to the at least one drive wheel. The drive assist user interface module can be configured to permit an operator of the system to selectively control movement of the at least one drive wheel. The drive assist user interface module can be part of or be attached to an attachment that includes a plate having a top surface. In one configuration, the top surface of the plate can be configured to extend parallel with a top surface of the platform when the attachment is attached to the platform.

34 Claims, 23 Drawing Sheets

Related U.S. Application Data

No. 15/610,486, filed on May 31, 2017, now Pat. No. 10,945,905.

(52) U.S. Cl.
CPC ...... *A61G 2203/10* (2013.01); *A61G 2203/32* (2013.01); *A61G 2203/44* (2013.01); *A61G 2205/60* (2013.01)

(58) Field of Classification Search
CPC .... A61G 2205/60; A61G 13/02; A61G 13/08; A61G 13/1285; A61G 7/002; A61G 7/012; A61G 7/015; A61G 7/065; A61G 13/0018; B60B 33/0018; B60B 33/0002; B60B 2200/26; A61D 3/00
See application file for complete search history.

(56) References Cited

U.S. PATENT DOCUMENTS

| | | | |
|---|---|---|---|
| 5,564,662 A | 10/1996 | Lussi et al. | |
| 5,628,078 A | 5/1997 | Pennington et al. | |
| 6,678,907 B1 | 1/2004 | Voelker et al. | |
| 7,255,366 B2 | 8/2007 | Davis et al. | |
| 7,610,637 B2 | 11/2009 | Menkedick et al. | |
| 7,679,520 B2 | 3/2010 | Zerhusen et al. | |
| 7,784,126 B2 | 8/2010 | Meissner et al. | |
| 10,945,905 B2* | 3/2021 | Hoel | A61G 13/02 |
| 2003/0047388 A1 | 3/2003 | Faitel | |
| 2003/0159861 A1 | 8/2003 | Hopper et al. | |
| 2005/0199430 A1* | 9/2005 | Vogel | A61G 7/0513 180/15 |
| 2006/0049936 A1 | 3/2006 | Collins et al. | |
| 2006/0117484 A1 | 6/2006 | Derenne et al. | |
| 2006/0277683 A1* | 12/2006 | Lamire | A61G 7/0507 5/425 |
| 2008/0020714 A1 | 1/2008 | Mezhinsky et al. | |
| 2011/0240409 A1 | 10/2011 | Bacon | |
| 2011/0272200 A1 | 11/2011 | Clapp et al. | |
| 2011/0277241 A1 | 11/2011 | Schejbal | |
| 2012/0047655 A1 | 3/2012 | O'Keefe | |
| 2013/0219623 A1 | 8/2013 | Jackson | |
| 2013/0227787 A1* | 9/2013 | Herbst | A61G 7/1067 5/618 |
| 2014/0236629 A1 | 8/2014 | Kim et al. | |
| 2015/0014959 A1 | 1/2015 | Youngmann et al. | |
| 2015/0045676 A1 | 2/2015 | Dawson et al. | |
| 2015/0250598 A1 | 9/2015 | Yakimicki et al. | |
| 2015/0257952 A1 | 9/2015 | Zerhusen | |
| 2016/0089283 A1* | 3/2016 | DeLuca | A61G 7/08 180/413 |
| 2016/0136356 A1 | 5/2016 | Ribble et al. | |
| 2016/0143796 A1 | 5/2016 | Jordan et al. | |
| 2016/0213543 A1 | 7/2016 | Hafner et al. | |
| 2016/0242978 A1 | 8/2016 | Jurka | |
| 2016/0331614 A1 | 11/2016 | Furman | |
| 2016/0374874 A1 | 12/2016 | Trepanier et al. | |
| 2017/0027797 A1* | 2/2017 | Dolliver | A61G 13/122 |
| 2017/0119607 A1 | 5/2017 | Derenne et al. | |
| 2017/0340498 A1 | 11/2017 | Tessmer et al. | |
| 2021/0196549 A1* | 7/2021 | Hoel | A61G 13/06 |

FOREIGN PATENT DOCUMENTS

| | | |
|---|---|---|
| JP | 2003-219885 A | 8/2003 |
| JP | 2003-305091 A | 10/2003 |
| JP | 2004-279154 A | 10/2004 |
| JP | 2006-296553 A | 11/2006 |
| JP | 2015-205049 A | 11/2015 |
| JP | 2017-46966 A | 3/2017 |
| WO | 2015159883 A1 | 10/2015 |

OTHER PUBLICATIONS

Operating Instructions—Mobile Operating Table Alphamaxx, Maquet 2008.
International Search Report and Written Opinion dated Oct. 16, 2018 for PCT/US2018/034830.
European Search Report in EP 22 20 8683 mailed Mar. 14, 2023.
Office Action dated Sep. 6, 2024 for Chinese Patent Application No. 202210551922.6.
Chinese Office Action for Application No. 202210551922.6 dated Mar. 1, 2024.

* cited by examiner

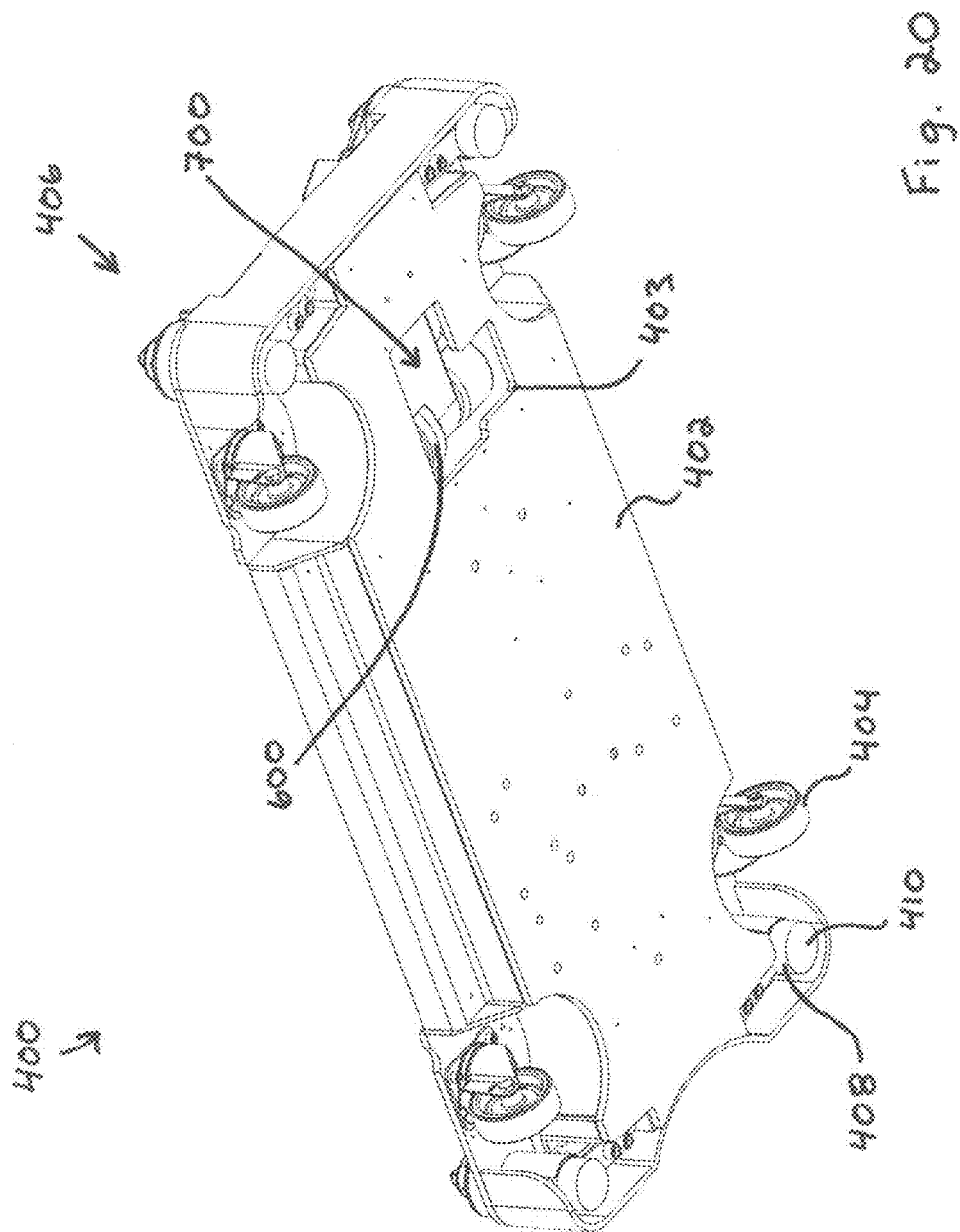

SYSTEM, APPARATUS AND METHOD FOR SUPPORTING AND/OR POSITIONING A PATIENT BEFORE, DURING, OR AFTER A MEDICAL PROCEDURE

CROSS-REFERENCE TO RELATED APPLICATIONS

This application is a continuation of U.S. application Ser. No. 17/200,267 filed Mar. 12, 2021, which is a continuation of U.S. application Ser. No. 15/610,486 filed May 31, 2017, now U.S. Pat. No. 10,945,905 which is hereby incorporated by reference in its entirety.

BACKGROUND

Patient support apparatuses, such as surgical tables, medical examination platforms, and hospital beds, are well known. This equipment is expected to support the weight of a patient before, during, and after a medical procedure, while giving the medical team unencumbered access to the surgical site and the ability to maneuver, position, or reposition the patient. Certain prior art equipment is capable of sensing changes in weight distribution, which can help the medical team properly position or reposition a patient, and prevent undesirable or inadvertent movement of the patient.

For example, U.S. Pat. No. 7,784,126 discloses an operating table having a support column and a table panel mounted on the support column. The table has a force measurement system for determining the weight of the table panel and of the patient on the table panel. The weight measurement is used to prevent tipping of the table.

U.S. Published Patent Application No. 2012/047655 discloses a patient bed having a base, an upper frame above the base, and a lift system to raise and lower the upper frame relative to the base between a low position and a high position. The bed can include a scale system that is coupled to or included as part of control circuitry. The scale system senses an amount of weight carried by upper frame. Threshold angles, i.e., angles at which an adverse situation such as tipping might occur, can be adjusted based on the amount of weight sensed by scale system.

U.S. Pat. No. 7,610,637 discloses patient supports having various weight sensors for determining the weight of the patient. A user interface is provided to indicate the addition or subtraction of medical equipment, such as an IV pole, to the patient support so that the weight of the medical equipment can be accounted for.

U.S. Pat. No. 7,255,366 discloses a system for monitoring patient weight on a patient support and detecting patient movement, such as an attempt to exit the patient support. Load cells are used to monitor weight on various parts of the support. A control system corrects measurements based on position or configuration of the support.

U.S. Pat. No. 5,628,078 discloses a surgical table having several removable sections that permit various possible configurations. Sensors detect a table configuration and send appropriate signals to a controller. Each of the above patents and publications are hereby incorporated by reference in their entirety.

The above-described and other conventional equipment have several limitations. For example, with at least certain of the prior art devices, accurate measurement of changes in weight distribution can be difficult to achieve. Some prior art devices are difficult or cumbersome to maneuver. The Steris® 5085 SRT surgical table has permanent handles mounted in the head or foot section, which, in certain situations, undesirably extend the overall length of the table. Certain prior art tables are not particularly stable, and can be expensive to manufacture. For instance, many prior art surgical tables utilize a vertical, hydraulic column, with telescoping block sections, to raise and lower the patient support platform. These tables can be expensive to manufacture, especially when designed to move downward close to the ground, and include oil in the hydraulic system that can inadvertently leak.

SUMMARY

In one embodiment, the presently disclosed technology is directed to a system for supporting or positioning a patient before, during, or after a medical procedure. The system can include a platform configured to support at least a portion of a patient. A support column can be positioned beneath the platform. A base can be positioned beneath the support column and configured to support the support column. The base can include at least one drive wheel configured to contact a ground surface and assist a user in moving the platform with respect to the ground surface. A drive assist user interface module can be operatively connected to the at least one drive wheel. The drive assist user interface module can be configured to permit an operator of the system to selectively control movement of the at least one drive wheel. The drive assist user interface module can be part of or attached to an attachment that includes a plate having a top surface. In one position or configuration, the top surface of the plate can be configured to be coplanar with or parallel to a top surface of the platform when the attachment is attached to the platform. In one or more other positions or configurations, the top surface of the plate can be configured to extend at an angle with respect to the top surface of the platform when the attachment is attached to the platform.

In another embodiment, the presently disclosed technology is directed to a system for supporting or positioning a patient before, during, or after a medical procedure. The system can include a platform configured to support at least a portion of a patient. A support column can be positioned beneath the platform. At least a portion of the support column, such as a cover thereof, can surround a support and lift mechanism configured to support, raise and lower the platform. The support and lift mechanism can include a first linkage system and a second linkage system. The first linkage system can include at least one upper 4-bar linkage and at least one lower 4-bar linkage. The second linkage system can include at least two link bars connected in series and can be configured to act in a plane perpendicular to the first linkage system. A base can be positioned beneath the support column and configured to support the support column. The base can include at least one drive wheel configured to contact a ground surface and move the platform with respect to the ground surface.

In yet another embodiment, the presently disclosed technology is directed to a system for supporting or positioning a patient before, during, or after a medical procedure. The system can include a platform configured to support at least a portion of a patient. A support column can be positioned beneath the platform. A base can be positioned beneath the support column and configured to support the support column. The base can include at least three spaced-apart casters that can be configured to contact a ground surface and allow mobility of the platform. The base can also include or surround at least one drive wheel configured to contact a ground surface and move the platform with respect to the ground surface. Additionally, the base can include at least three load sensing/floor lift mechanisms that can each be configured to contact a ground surface and prevent the platform from being inadvertently moved with respect to the ground surface. Each of the at least three load sensing/floor lift mechanisms can include a support foot and a motor. The motor can be configured to raise the support foot to permit the caster wheel to contact the ground surface. The motor can also be configured to lower the support foot to at least slightly raise the base and prevent one or more caster wheels from contacting the ground surface.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings various illustrative embodiments. It should be understood, however, that the invention is not limited to the precise arrangements and instrumentalities shown. In the drawings:

FIG. 20 is another perspective view thereof;

DETAILED DESCRIPTION

Figure 1:
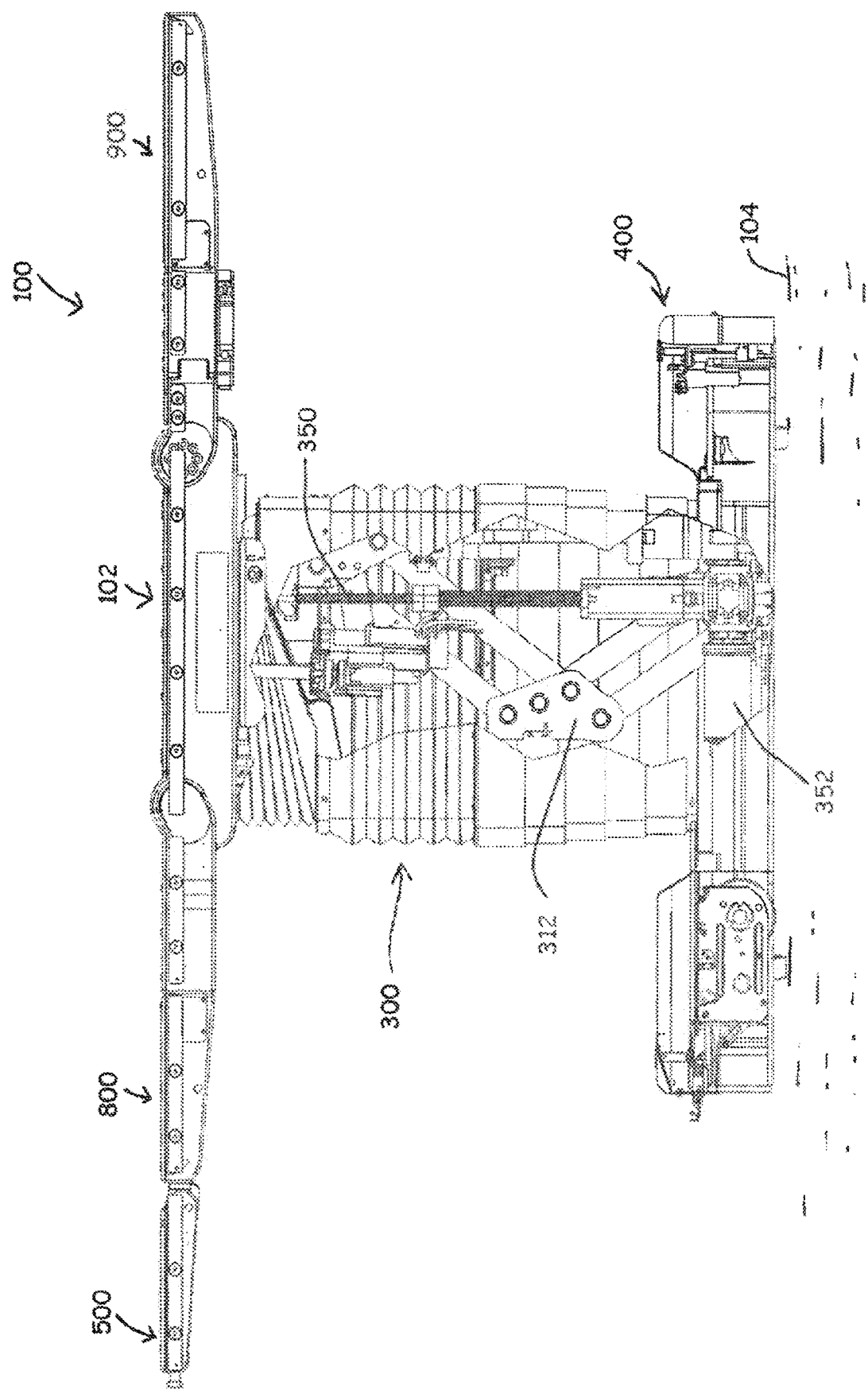
FIG. 1 is a cross-sectional side elevation view of at least a portion of a system or apparatus according to an embodiment of the present disclosure, wherein certain components are shown as transparent or translucent, or even omitted, for clarity.

While systems, apparatus and methods are described herein by way of examples and embodiments, those skilled in the art recognize that the systems, apparatus and methods of the presently disclosed technology are not limited to the embodiments or drawings described. It should be understood that the drawings and description are not intended to be limited to the particular form disclosed. Rather, the intention covers all modifications, equivalents and alternatives falling within the spirit and scope of the appended claims. Any headings used herein are for organizational purposes only and are not meant to limit the scope of the description or the claims. As used herein, the words "is" and "may" are used in a permissive sense (i.e., meaning having the potential to) rather than the mandatory sense (i.e., meaning must). Similarly, the words "include," "including," and "includes" mean including, but not limited to. Unless specifically set forth herein, the terms "a," "an" and "the" are not limited to one element but instead should be read as meaning "at least one." The term "actuator" is broadly defined herein to mean any component capable of at least initiating movement or control of a mechanism, a part, or a system, and includes a trigger, a button, a switch or any other enabling device. The terminology includes the words noted above, derivatives thereof and words of similar import.

Referring to the drawings in detail, wherein like numerals indicate like elements throughout, the presently disclosed technology is directed to an at least partially modular, multi-component system, apparatus and method that allows a surgeon and/or a medical team to better monitor, support, position, reposition and/or maneuver a patient before, during, and/or after surgery through electrical and/or mechanical means. The presently disclosed technology allows the surgeon and/or the medical team to support the patient vertically above the floor or ground, while allowing the surgeon and/or medical team to more quickly and easily move or position the patient, and/or provides other functionality and benefits. The term "patient" is broadly defined herein to include human patients of all sizes, genders and demographics, as well as animals (e.g., for veterinarian purposes). The system or apparatus, generally designed 100, may be referred to herein as a surgical table. The surgical table can be in any of a variety of types or styles, and can be modified in size, shape and/or configuration from that shown and described herein.

FIG. 1 shows one embodiment of a surgical table 100 of the presently disclosed technology. The surgical table 100 can include an upper platform 102, a lower base 400, a support column 300 therebetween, and table support or first attachment 500. The surgical table 100 can also include additional attachments or modules, such as but not limited to a second attachment 800 and a third attachment 900. In one aspect, the attachments 500, 800, 900 can serve to extend the length of the surgical table 100, thereby allowing the surgical table 100 to fully support patients of different sizes and lengths. A patient can be placed or laid directly on the platform 102 (and can extend at least partially onto the attachment 500 or one or more other attachments), and at least a portion of the base 400 can contact the floor or ground surface 104. The support column 300 can be selectively adjustable, as described in detail below, to allow the surgeon and/or the surgical team to adjust the position of the platform 102 with respect to the base 400.

As described in further detail below, the surgical table 100 can include a drive assist assembly that can include a drive assist mechanism 700 and a drive assist user interface module 508. The mechanism 700 can reside in the base 400 and the module 508 can reside on or be connected to one or more attachments to the upper platform 102 and at either end thereof. The mechanism 700 can include at least one drive wheel 600, and the mechanism 700 can be configured to move or pivot the at least one drive wheel 600 between a stowed position and a use position so as to engage and disengage the ground surface 104. The module 508, in combination with one or more other components or parts of the surgical table 100, can allow the surgeon or the medical team to assist in positioning the surgical table 100, control various functionality of the surgical table 100, and/or position, re-position, or move the surgical table 100 in a quick and efficient manner.

Figure 2:
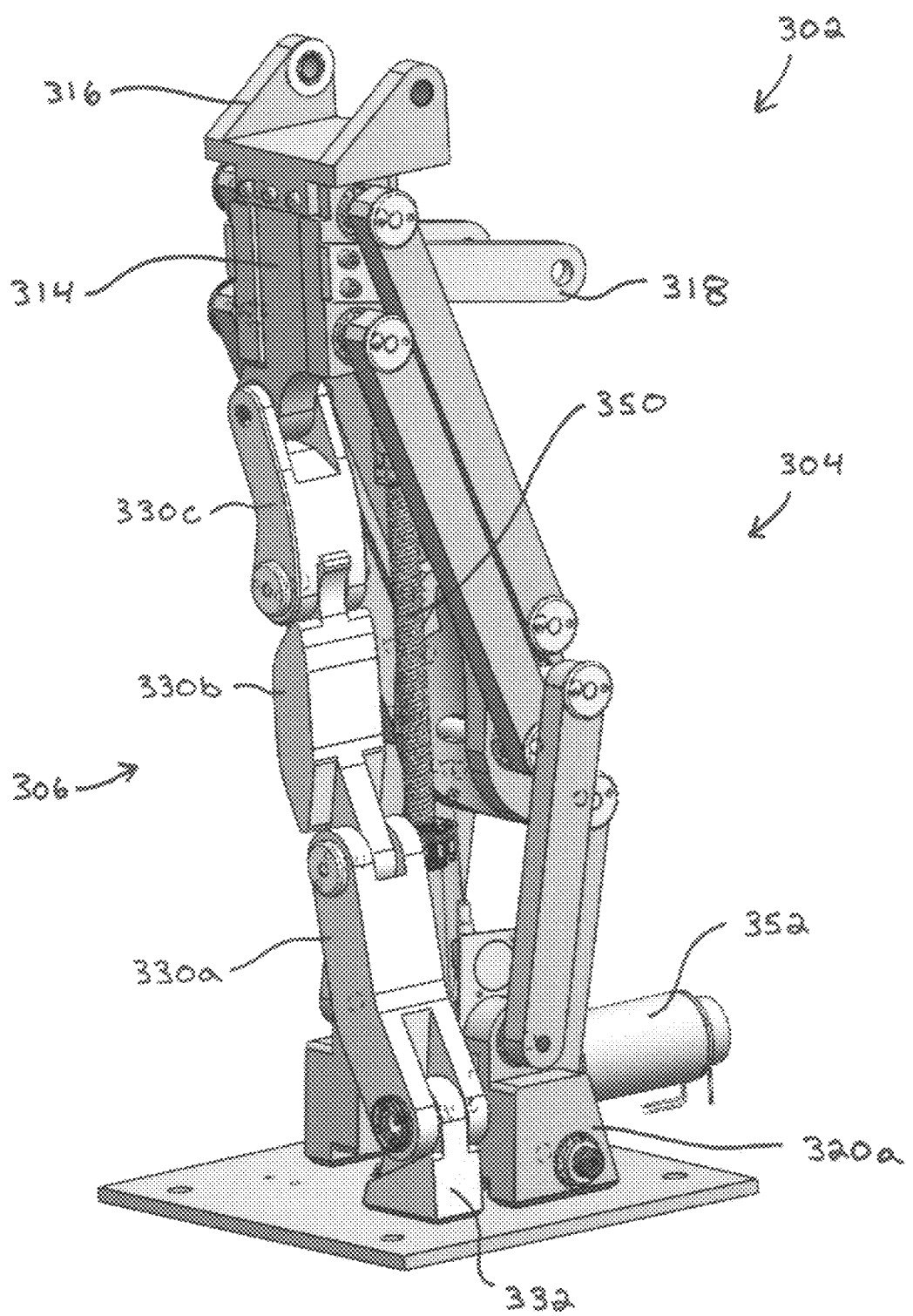
FIG. 2 is a perspective view of a support and lift mechanism according to one embodiment of the present disclosure, wherein the mechanism is shown in an extended or expanded configuration.
Figure 3:
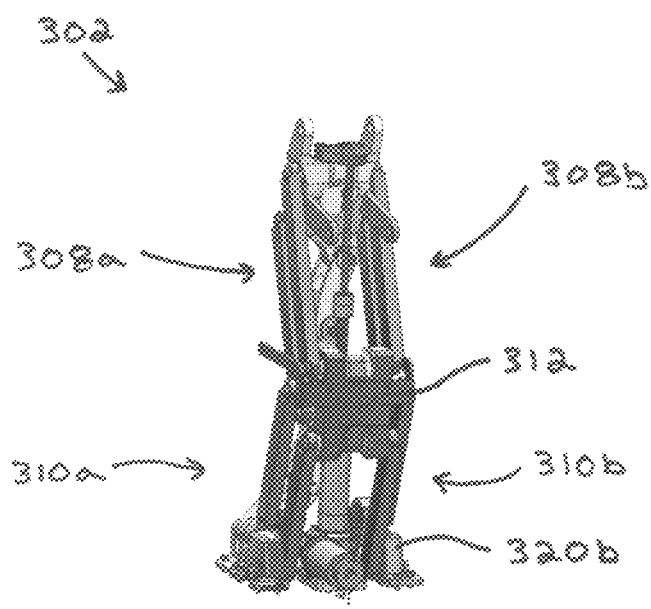
FIG. 3 is another perspective view of the mechanism shown in FIG. 2.
Figure 4:
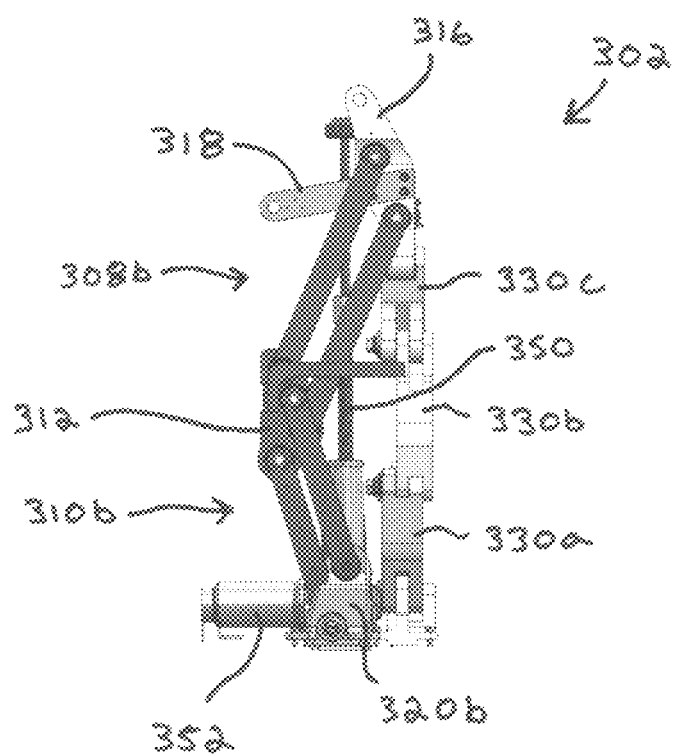
FIG. 4 is a side elevation view of the mechanism shown in FIG. 3.
Figure 5:
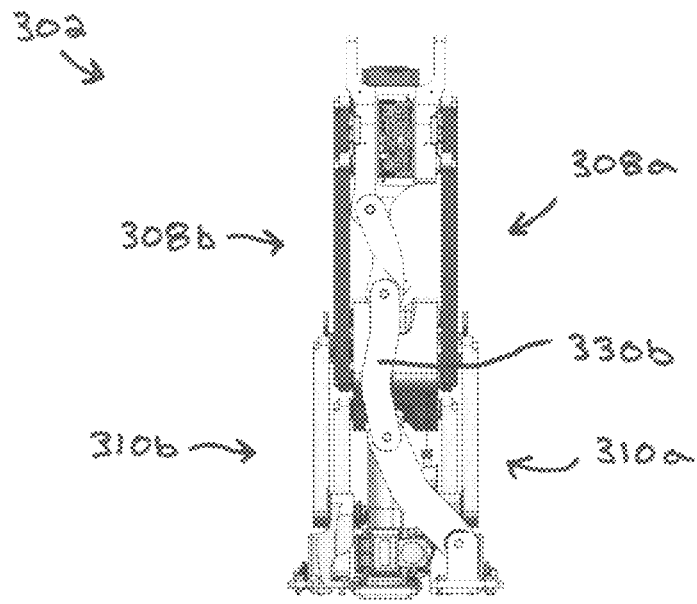
FIG. 5 is a front elevation view of the mechanism shown in FIG. 3.
Figure 6:
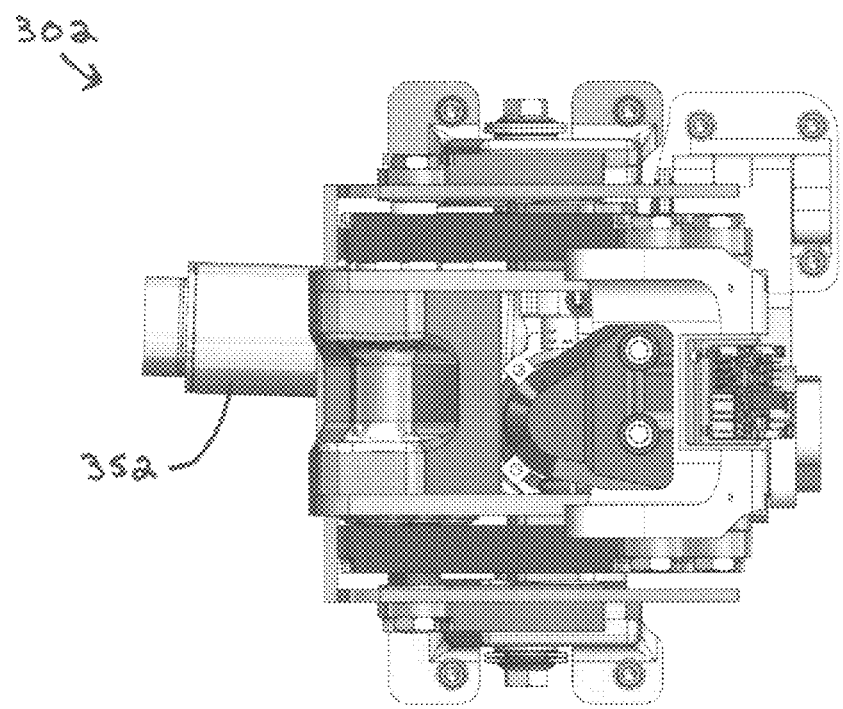
FIG. 6 is a top plan view of the mechanism shown in FIG. 3.
Figure 7:
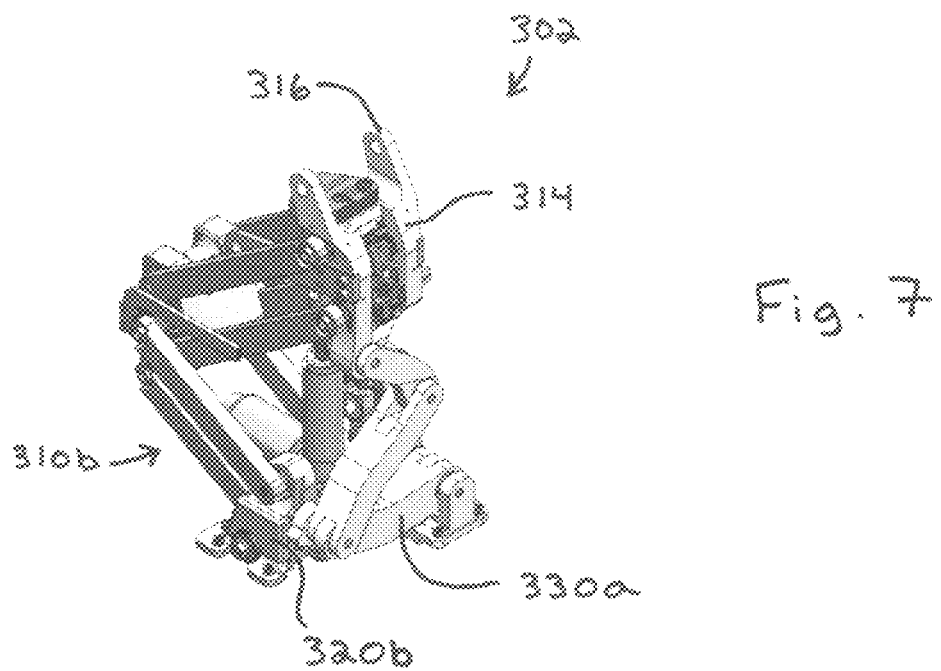
FIG. 7 is a perspective view of the mechanism shown in a middle or partially expanded configuration.
Figure 8:
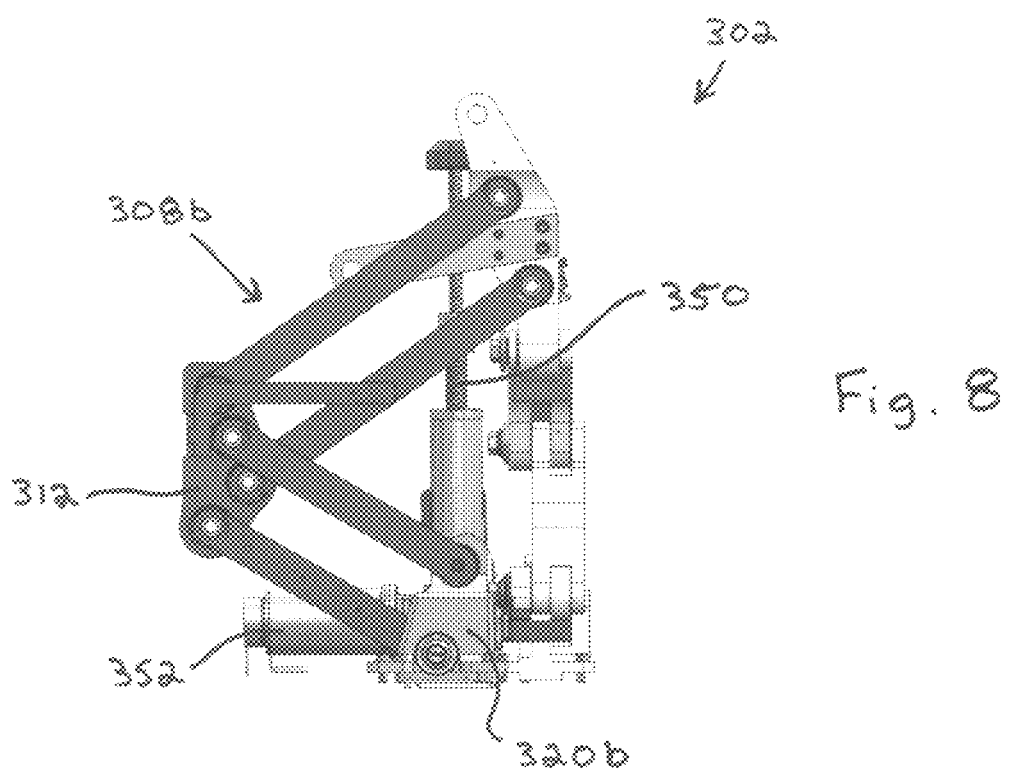
FIG. 8 is a side elevation view of the mechanism shown in FIG. 7.
Figure 9:
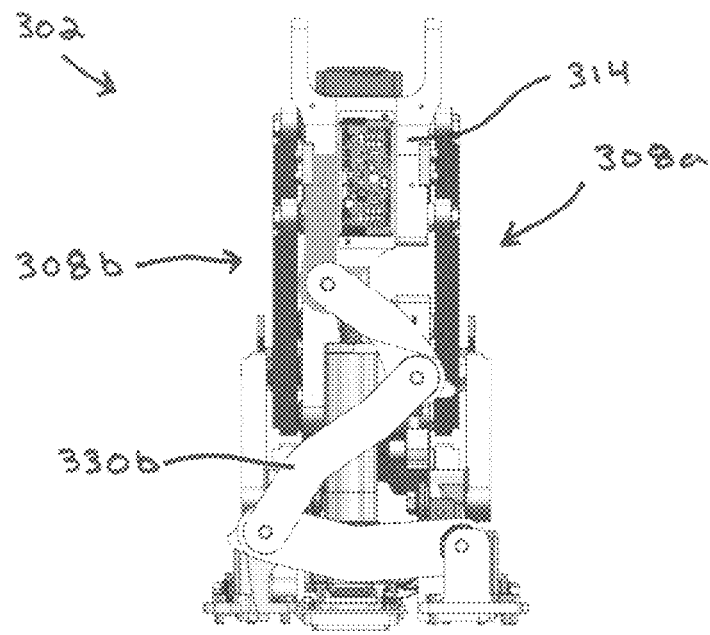
FIG. 9 is a front elevation view of the mechanism shown in FIG. 7.
Figure 10:
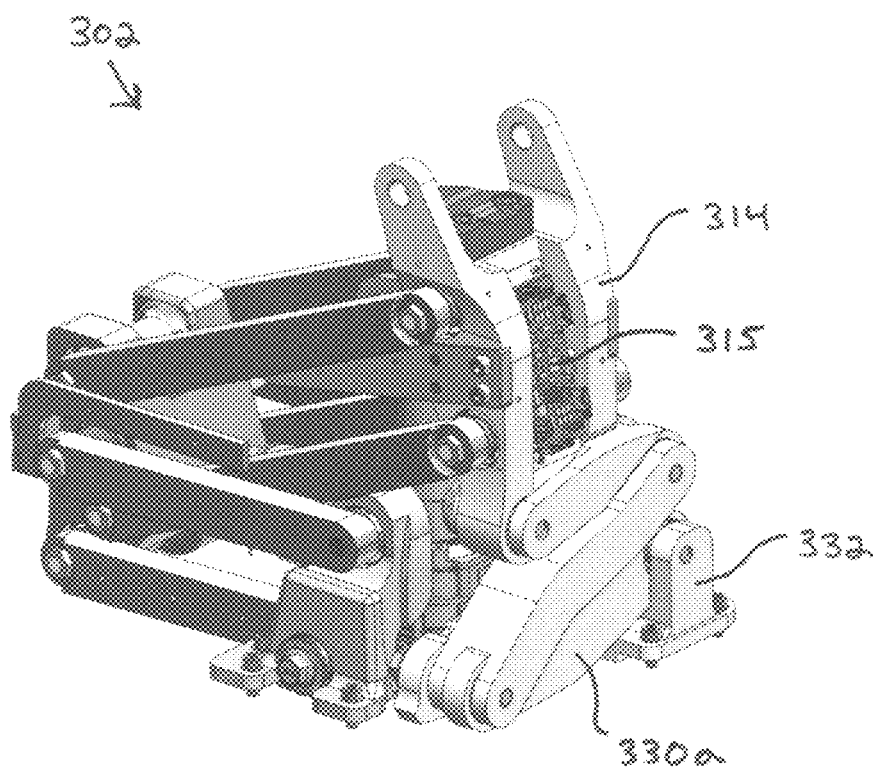
FIG. 10 is a perspective view of the mechanism shown in a compressed or collapsed configuration.
Figure 11:
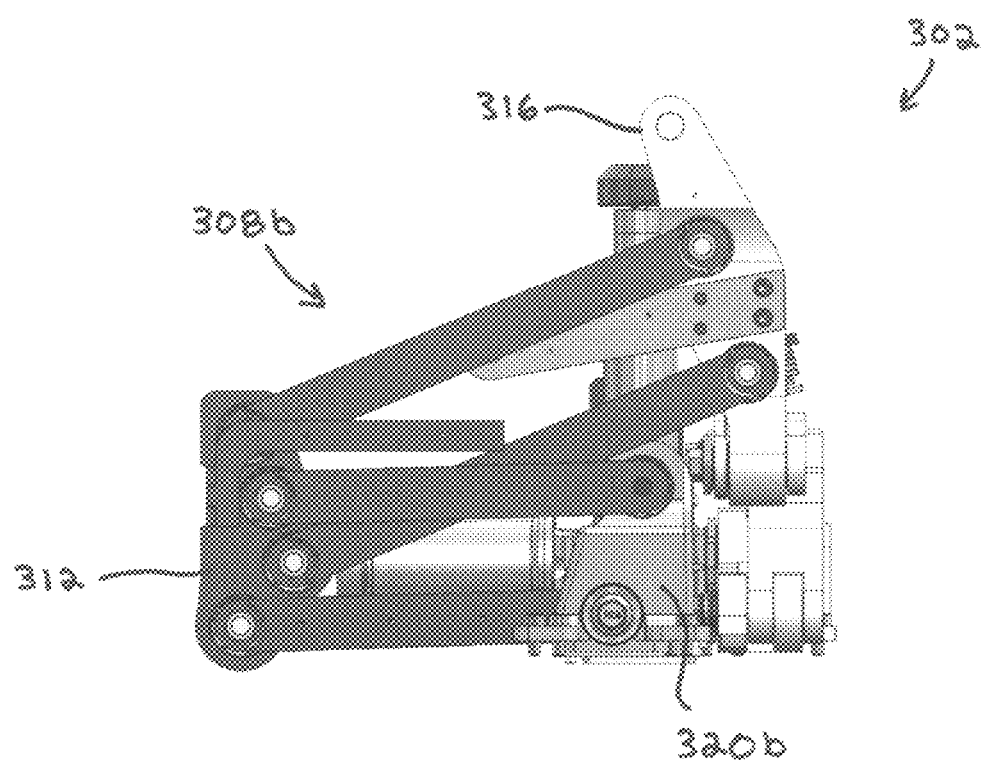
FIG. 11 is a side elevation view of the mechanism shown in FIG. 10.
Figure 12:
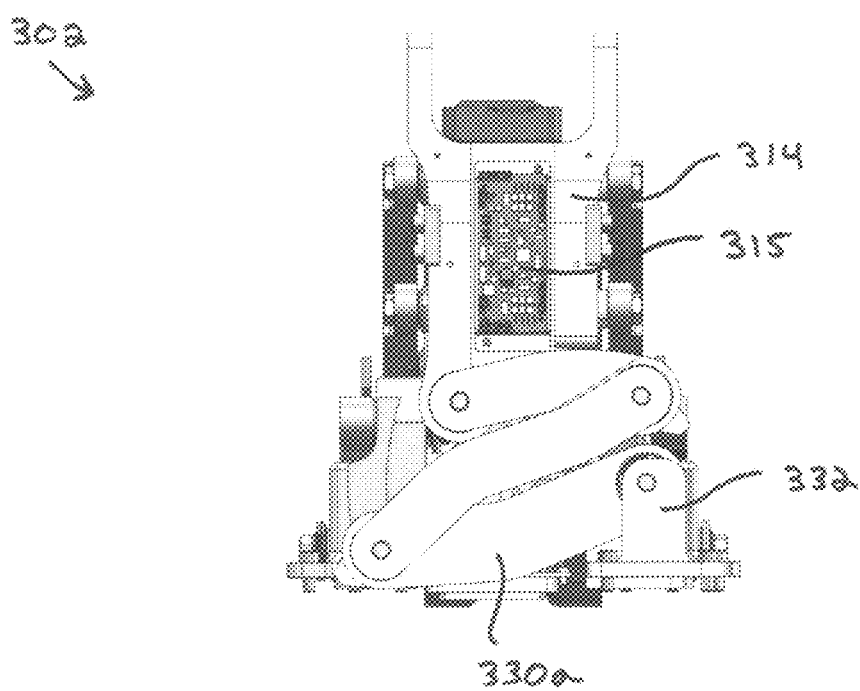
FIG. 12 is a front elevation view of the mechanism shown in FIG. 10.
Figure 13:
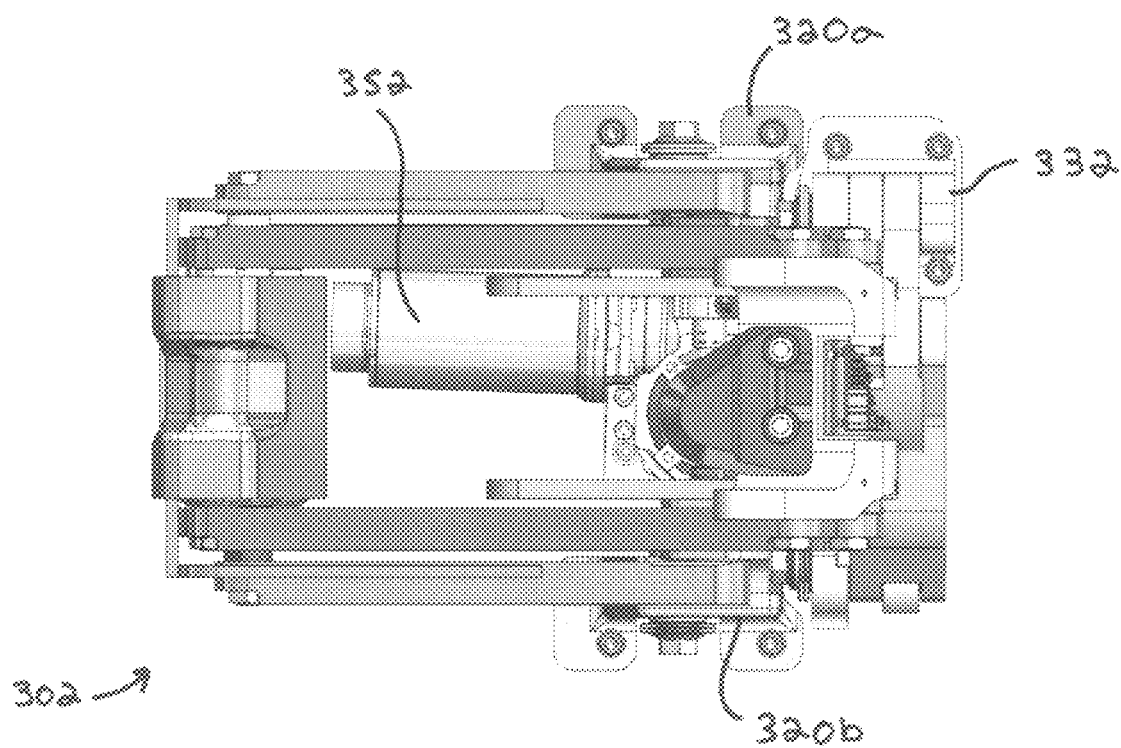
FIG. 13 is a top plan view of the mechanism shown in FIG. 10.

Referring to FIGS. 1-13, one or more embodiments of the support column 300 can include a support and lift mechanism, generally designated 302, having a first linkage system 304 and a separate second linkage system 306 (see FIG. 2). The two linkage systems 304, 306 can be connected or attached at one, two, or more points, and can complement each other to raise and/or lower the platform 102 in an efficient, stable and/or compact manner. As evident from the structure described below, at least the first linkage system 304 (either alone or in combination with the second linkage system 306) can provide resistance to moments of the surgical table 100 about the roll or tilt (i.e., x axis), pitch or Trendelenburg (i.e., y axis), and yaw or table twist about the vertical (i.e., z axis), and/or resistance to forces in the lateral direction. If first and second linkage systems 304, 306 are mounted in perpendicular planes, the combination also provides resistance to forces in the longitudinal direction.

The first linkage system 304 can include at least one or two spaced-apart and parallel sets 308a, 308b of upper 4-bar linkages that can be connected by axles and supported on bearings, such as tapered roller bearings, ball bearings or bushings. One set 308a of the upper 4-bar linkages can be on the left side of the mechanism 302, and the other set 308b of the upper 4-bar linkages can be on the right side of the mechanism 302. The first linkage system 304 can also include at least one or two spaced-apart and parallel sets 310a, 310b of lower 4-bar linkages that can be connected by axles and supported on tapered roller bearings. One set 310a of the lower 4-bar linkages can be on the left side of the mechanism 302, and the other set 310b of the lower 4-bar linkages can be on the right side of the mechanism 302. In total, in one embodiment, the first linkage system 304 can include four 4-bar linkages. Those skilled in the art understand that a 4-bar (or four-bar) linkage is considered the simplest movable closed chain linkage. It consists of four bodies, called bars or links, connected in a loop by four joints. Generally, the joints are configured so the links move in parallel planes.

The sets 308a, 308b, 310a, 310b of the upper and lower 4-bar linkages can be arranged in series with each other and joined or connected by common element, such as a "floating" or movable torque reactor 312. An upper torque reactor 314, which can form part of each of the upper 4-bar linkages, can connect the remaining portions of the upper 4-bar linkages to a Trendelenburg axle mount 316 and a Trendelenburg actuator mount 318. In one embodiment, the upper torque reactor 314 can support and/or enclose a printed circuit board (PCB) 315 (see FIGS. 10 and 12), which can contribute to allowing the surgeon and/or medical team to move or reposition the surgical table 100 and/or the mechanism 302. At least one or two spaced-apart lower support mounts 320a, 320b, which can form part of each of the lower 4-bar linkages, can connect (directly or indirectly) the remaining portions of the lower 4-bar linkages to the base 400.

In one embodiment, the sets 310a, 310b of the lower 4-bar linkages can be spaced at least slightly outwardly of the sets 308a, 308b of the upper 4-bar linkages. As a result, at least a portion of the sets 308a, 308b of the upper 4-bar linkages can be positioned between at least a portion of the sets 310a, 310b of the lower 4-bar linkages. This configuration allows for the mechanism 302 to have a generally compact configuration when in a collapsed or compressed state (see FIGS. 10-13).

The second linkage system 306 (e.g., a cross link) can be formed from two, three or more link bars 330a, 330b, 330c connected in series and a lower support block 332 attached (directly or indirectly) to the base 400 through any of a variety of means (e.g., screws, bolts, welding, etc.). The link bars 330a, 330b, 330c of the second linkage system 306 can be hinged or arranged to pivot such that the axels of each of the link bars 330a, 330b, 330c extend perpendicularly to the axels of the upper and lower 4-bar linkages. The second linkage system 306 can be positioned with respect to the first linkage system 304 such that the mechanism has a generally compact configuration when in a collapsed or compressed state (see FIGS. 10-13). This compact configuration allows the upper platform 102 to move downwardly closer to the ground surface 104 than prior art equipment.

In operation of one embodiment of the presently disclosed technology, the motion of the 4-bar linkages can be restricted to motion in only the x and z planes (i.e., no motion in the y plane). The motion of the link bars 330a, 330b, 330c can be limited to motion in only the y and z planes (i.e., no motion in the x plane). The first and second linkage systems 304, 306 can be connected to each other at or by the upper torque reactor 314 and/or at or by the base 400. In one embodiment, when combined, the only motion permitted by the first and second linkage systems 304, 306 is in the z axis (e.g., up and down). Thus, when combined, first and second linkage systems can provide resistance to all motion except the raising and lowering of the upper platform 102.

Vertical lift or upward force on or to the upper platform 102 can be provided by a raising/lowering mechanism 350, such as lead screw or piston, and/or an actuator or motor 352 operatively connected thereto. The raising/lowering mechanism 350 can be concentric and/or telescoping, and can be a threaded rod and nut, ball screw, or a roller screw. In one embodiment, a concentric design having dual, parallel screws can be used. In another embodiment, dual concentric screws (i.e., 4 total screws) can be used and can be less expensive. In yet another embodiment, the raising/lowering mechanism 350 can be a push chain, which can be hinged to bend in one direction, but limited to bend in another direction.

The raising/lowering mechanism 350 can be positioned within or surrounded by the first and second linkage systems 304, 306. Thus, as the raising/lowering mechanism 350 expands or collapses (e.g., through rotation of a portion thereof), the first and second linkage systems 304, 306 can expand or collapse around the raising/lowering mechanism 350, thereby making an efficient and compact structure. In one embodiment, the raising/lowering mechanism 350 and/or the actuator 352 can provide all of the lift force to the upper platform 102, while the first and second linage systems 304, 306 can help reduce moment loading and/or increase lateral stiffness or stability of the surgical table 100.

Figure 14:
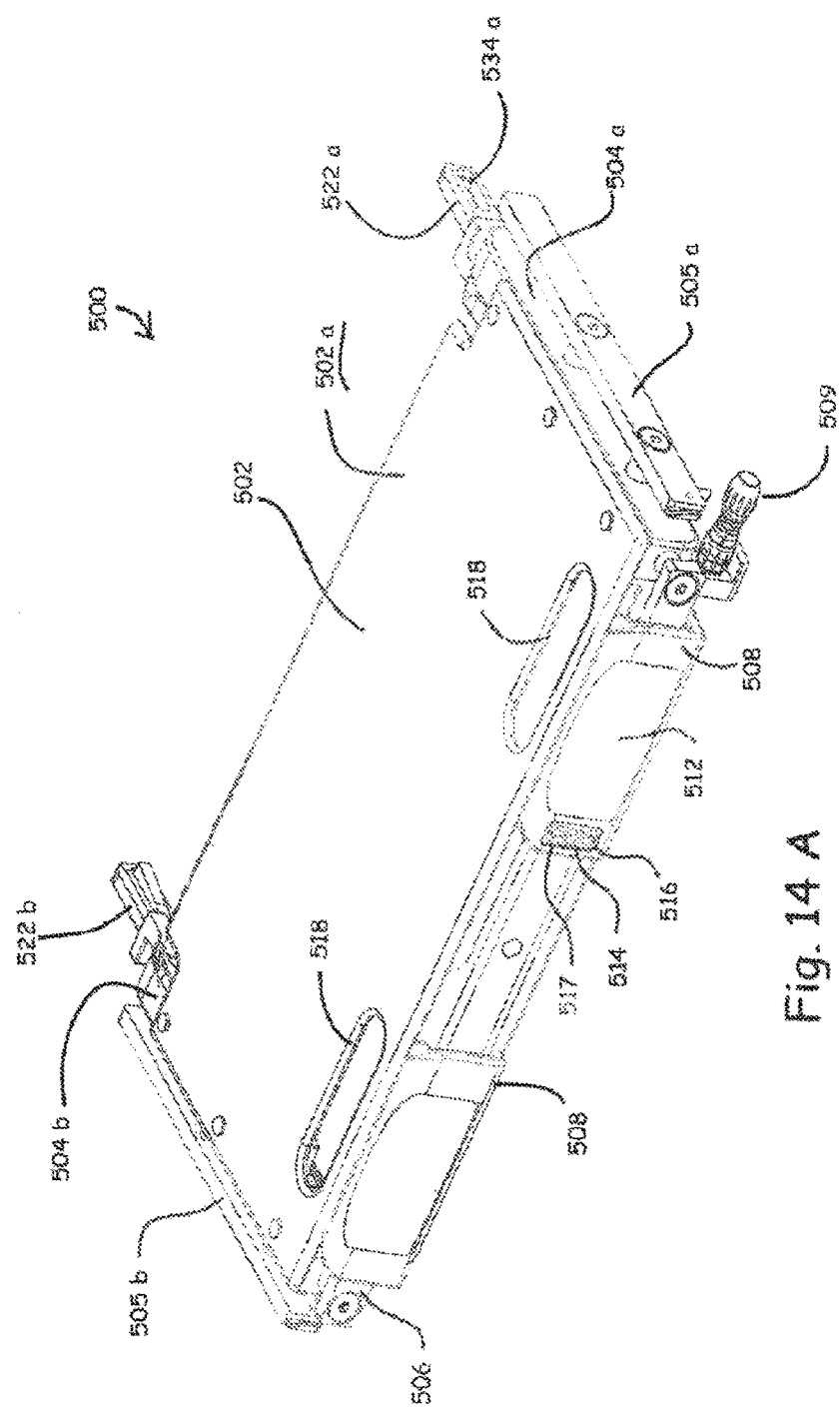
FIG. 14A is a perspective view of a table platform or first attachment according to one embodiment of the present disclosure, wherein a user interface module is shown on the table platform or attachment in an upward or deployed position.
FIG. 14B is another perspective view of the attachment shown in FIG. 14A.
FIG. 14C is yet another perspective view of the attachment shown in FIG. 14A with certain features removed for clarity, wherein the module is shown in a downward or stowed position.
FIG. 14D is a perspective view of the attachment shown in FIG. 14C, wherein the module is shown between the deployed and stowed positions.
Figure 14A:
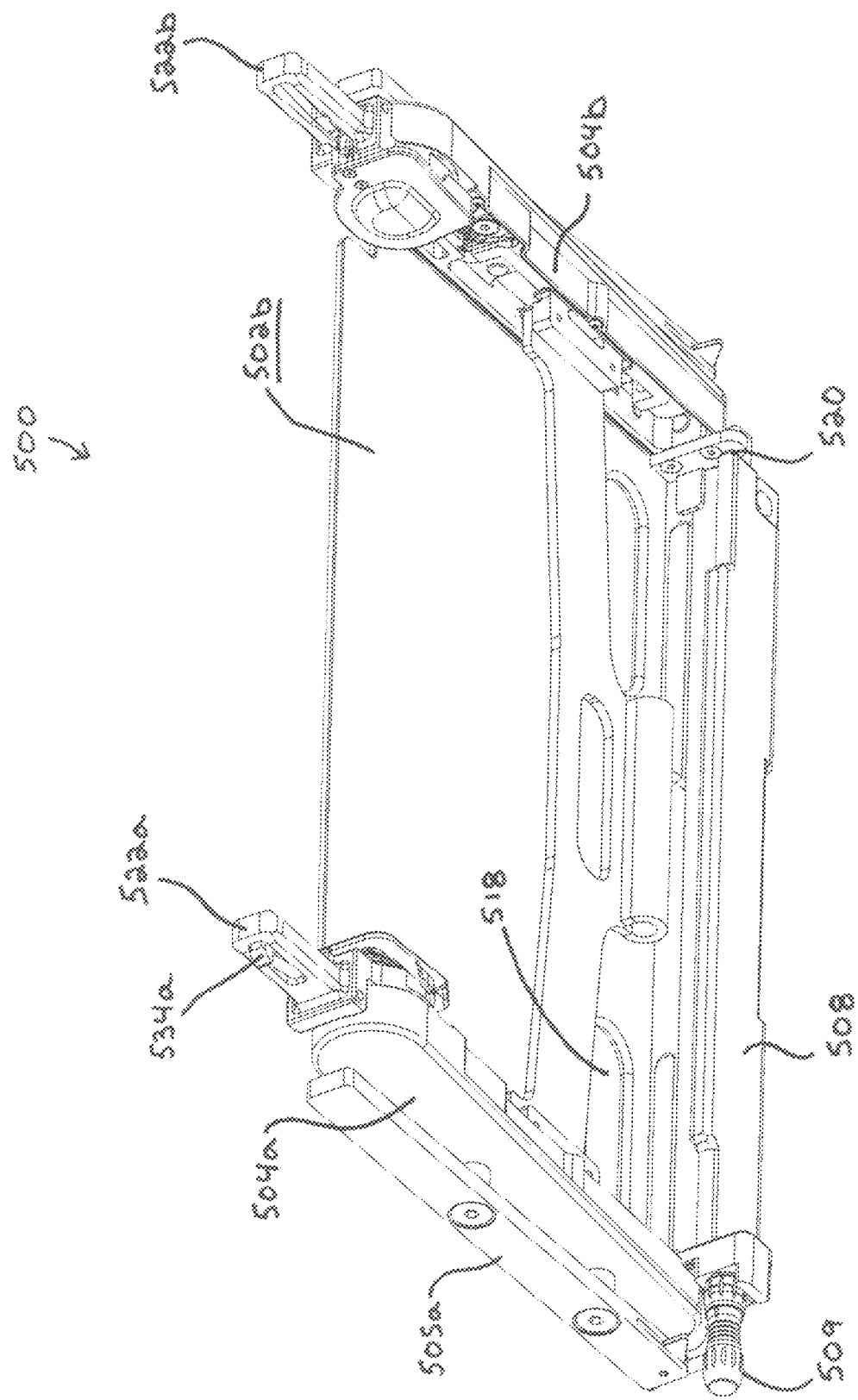
Figure 14C:
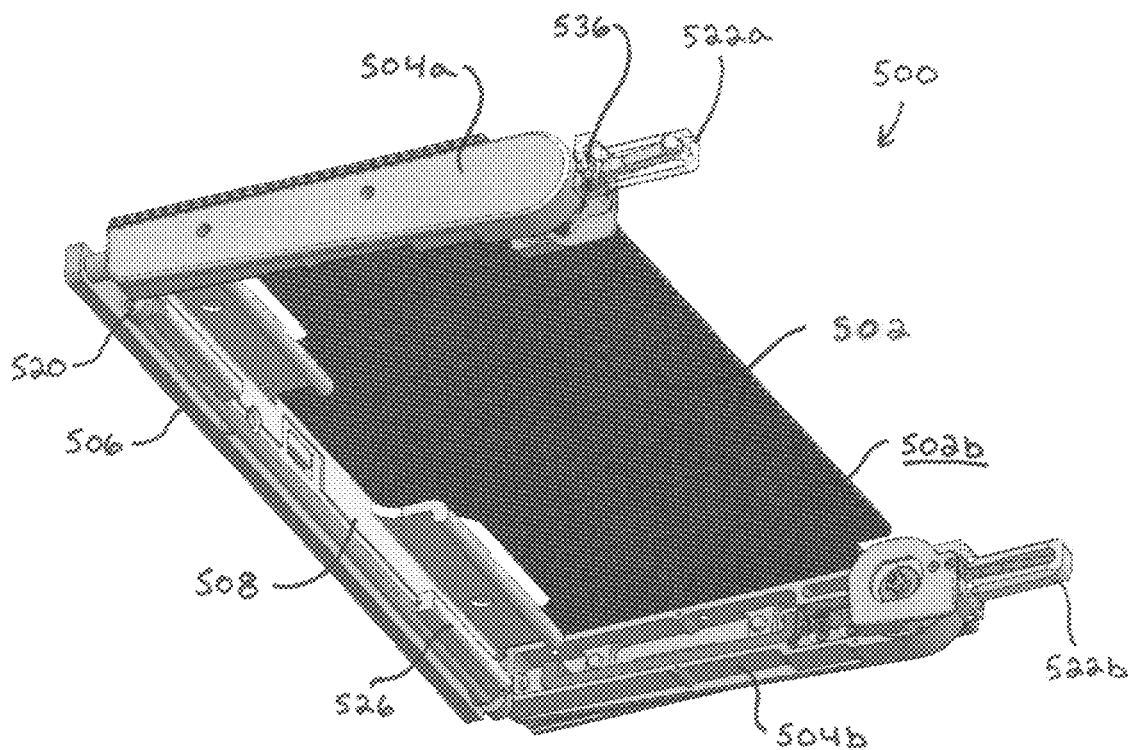
Figure 15:
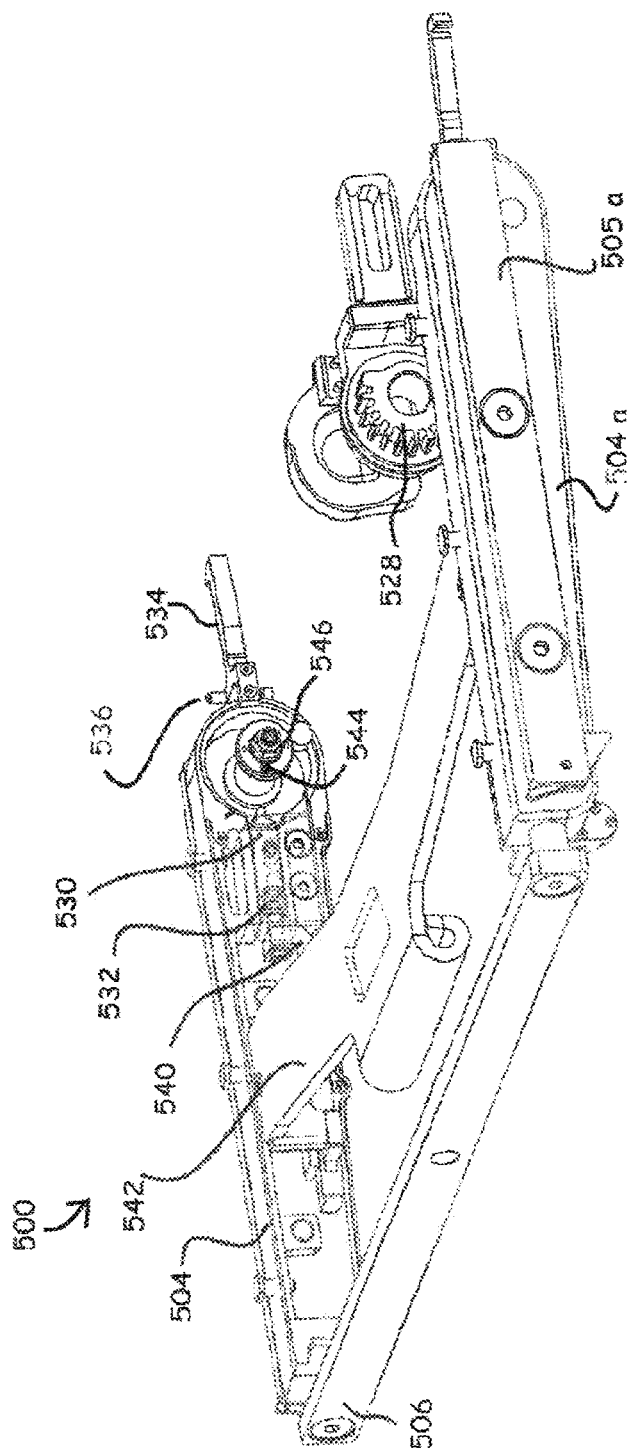
FIG. 15 is a magnified partially exploded perspective view of the attachment shown in FIG. 14 with certain features removed for clarity.

FIGS. 14A-15 show embodiments of the table platform or first attachment 500 with one or more other components of the system. The first attachment 500 can be in the form of a head platform configured to be removably attachable to at least a portion of the upper platform 102. The first attachment 500 can be configured to support at least a portion of a patient's head and/or upper body during a surgery. As mentioned above, the system can also include one or more other platforms or attachments, each of which can be removably attachable to each other and/or the upper platform 102 and can be configured or designed to support other portions of a patient (e.g., lower body or legs) during a surgery. In one embodiment, the first attachment 500, the second attachment 800 and the third attachment 900 can each be an optional patient support segment designed to be removably attachable to a remainder of the surgical table. For example, as mentioned above, the first attachment 500 can be in the form of a removable head support section. The second attachment 800 can be in the form of a removable back support section, and the third attachment 900 can be in the form of a removable leg or lower body support section.

FIGS. 14A-14D show the first attachment 500 with a drive assist user interface module 508, which, as described in detail below, can provide an operator with the ability to move, maneuver, position, and/or re-position the surgical table 100 quickly, easily and/or efficiently. Due to its position and configuration, the combination of the drive assist user interface module 508 and the first attachment 500 can also provide the operator with increase comfort or a better "feel" for moving the surgical table 100. In one embodiment, the drive assist user interface module 508 can include one or more actuators that provide the ability (e.g., through a motor) to selectively steer and/or adjust the speed of the at least one drive wheel 600 of the surgical table 100. For example, drive assist user interface module 508 can be configured to control the linear speed of the surgical table 100 (e.g., very slow (creep), medium, and fast) with respect to the ground surface 104 and/or the direction (e.g., forward or reverse) of movement of the surgical table 100. The positioning of the combination of the drive assist user interface module 508 and the first attachment 500 with respect to a remainder of the surgical table 100, the ergonomic nature of the combination, and the functionality of the drive assist user interface module 508 provides the operator with more control than is provided by prior art devices.

As described in detail below, the drive assist user interface module 508 or one or more portions thereof can allow the operator (e.g., the surgeon or any member of the medical team) to control movement of the surgical table 100 with both hands firmly gripping the first attachment 500 and/or the surgical table 100 at all times. With certain prior art tables, the operator's one hand must be holding a separate hand pendant or a unique module off to the side or above the table. In contrast, the drive assist user interface module 508 of the presently disclosed technology can be always present on or with the surgical table 100, so an operator does not need to find and install an accessory, yet it can be stowed or attached in a manner that has minimal or beneficial effect on usage of the surgical table 100.

The first attachment 500 can contain or be attached to drive assist user interface module 508, and either or both can be formed of any lightweight and high strength material, such as a durable plastic, like glass-filled nylon. The first attachment 500 can include a plate 502 supported by at least one or two spaced-apart and parallel arms 504a, 504b and a rail or cross-beam 506 connecting two ends of the arms 504a, 504b. The plate 502 can include a top surface 502a and an opposing bottom surface 502b. When the first attachment 500 is properly attached to a remainder of the surgical table 100, the plate 502 can be generally co-planar with the upper platform 102. Each arm 504a, 504b can include a side rail 505a, 505b attached thereto and spaced at least slightly outwardly therefrom. The side rails 505a, 505b are omitted from FIGS. 14C and 14D, as are certain other components of the presently disclosed technology, for clarity.

In one embodiment, the drive assist user interface module 508 can be pivotably and/or removably attachable with respect to at least a portion of the cross-beam 506. In another embodiment, the module 508 can be attached to arms 504a, 504b via one or more brackets or pivot points 520 (see FIGS. 14B and 14C), such that the module 508 is pivotable about an axis that extends parallel to the cross-beam 506. Regardless of how it is attached to the first attachment, the drive assist user interface module 508 can include the necessary electronics, power source (e.g., batteries), actuators or buttons, latch magnet(s) and/or connector(s) to accomplish the functionality described herein.

Figure 14D:
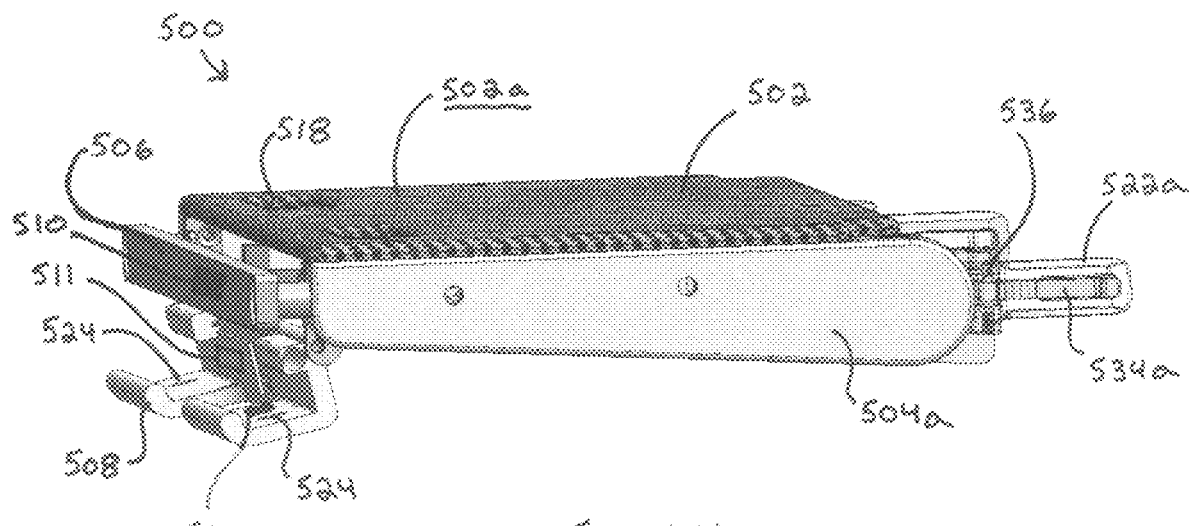

In one embodiment, the module 508 can be movable between a downward or stowed (e.g., non-use) position (see FIG. 14C) and an upward or use position (see FIGS. 14A and 14B). In the deployed or use position, at least a portion of the module 508 can wrap around and/or cover at least a portion of the cross-beam 506. FIG. 14D shows the module 508 in a position between the stowed and deployed positions. An electrical connector 509 can extend outward from the module 508 and can be electrically connected to a remainder of the surgical table 100 by means of a cable or wire (not shown). Therefore, the connector 509 can be configured to permit power to be supplied to the one or more batteries and communicate with the module 508 during initialization.

However, during use of one embodiment of the surgical table 100, the cable and connector 509 are removed from the surgical table 100. In one embodiment, when the cable and connector 509 are attached to the surgical table 100, the first attachment 500 can communicate without using the wireless technology. This is useful in case where the batteries (described in detail below) of the module 508 run out of power prior to or during an intended movement of the surgical table 100.

The module 508 can include one or more spaced-apart connection mechanisms 524 (see FIG. 14D), such as magnets, mechanical latches or detents built into one or more of the components, that can be configured and/or positioned to hold the module 508 in the use position against the crossbeam 506. Likewise, the connection mechanism(s) 524 or other connection mechanisms can be designed and/or configured to hold or otherwise support the module 508 in the stowed position.

Controls embedded in, attached to, or mounted on the module 508 and/or one or more actuators of the module 508 can be configured to sense the presence of one or more of the connection mechanisms 524 (e.g., magnets) and create and automatic on/off switch. When the module 508 is deployed and when the connection mechanism(s) 524 is/are sensed, the capacitive enable switch and wireless functionality can be active (e.g., drawing power and being in an "on" state). When the module 508 is in the stowed position (e.g., magnet(s) 524 not sensed), the power can be reduced or turned off. This can serve as both a safety feature and a power saving feature.

In addition, the controls described above can allow the operator of the surgical table 100 to selectively adjust table transport speed and/or direction. For example, a capacitive switch or sensor 510, which can be separate from or embedded within a printed circuit board (PCB) 511 (shown schematically in FIG. 14D), can be located on or mounted to the module 508. As understood by those of ordinary skill in the art, capacitive switches, like sensor 510, do not require physical actuation, only physical proximity.

In one embodiment, a palm grip 512 (sometimes referred to herein as a "first actuator" for convenience only) of the module 508 can be aligned with and/or complement the switch 510 when the module 508 is properly attached to and/or positioned with respect to the cross-beam 506. Engagement of the palm grip 512 by the operator (e.g., by the palm of his/her hand) can enable the switch 510, thereby allowing one or more motion control buttons (described in detail below) to become active. In one embodiment, the above engagement/activation alone does not move the surgical table 100 or otherwise actuate the drive wheel(s) 600. Instead, in such an embodiment, the above engagement/activation can permit the operator to move the surgical table 100 and/or actuate the drive wheel(s) 600 through a second or additional step (e.g., engagement of a separate actuator).

In one embodiment, this configured provides an increased level of safety, which is not provided with a pendant commanded table). For example, in order for the operator's palm to be placed on the palm grip 512, at least a portion of his/her fingers must extend through the holes 518 and ideally will grip at least a portion of the first attachment 500, thereby exerting control of the surgical table 100. In certain embodiments, the surgical table 100 can weigh as much as approximately 900 lbs. unloaded, and as much as approximately 1500 lbs. with a patient thereon.

As shown in FIG. 14, the module 508 can include the one or more motion control buttons, such as a second actuator 514, a third actuator 516, and a fourth actuator 517. All of the actuators 512, 514, 516, 517 can be spaced-apart from each other. In one embodiment, the actuators 512, 514, 516, 517 can be arranged such that while at least a portion of one hand of the operator's palm engages the first actuator 512, at least a portion of the operator's thumb can easily engage any of the second, third and fourth actuators 514, 516, 517. The size, shape and/or location of each of the actuators 512, 514, 516, 517 are not limited to that shown in FIG. 14 and described herein. For example, instead of all of the actuators 512, 514, 516, 517 being located on a right hand portion of the module 508, one or more of the actuators 512, 514, 516, 517 can be located on a left hand portion of the module 508. The second and third actuators 514, 516 can be momentary switches configured to initiate or control forward and reverse, respectively, motion of the surgical table 100 and/or the drive wheel(s) 600. The fourth actuator 517 can be a momentary switch configured to initiate "fast forward" motion of the surgical table 100 and/or the drive wheel(s) 600.

In one embodiment, when either the palm grip 512 or one of the second, third or fourth actuators 514, 516, 517 is not engaged, contacted or depressed, motion of the surgical table 100 and/or the drive wheel(s) 600 is halted or stopped. In other words, if and when the operators "lets go" of the module 508 such that the first actuator is not engage or any of the second, third and fourth actuators 512, 514, 516, 517 are not engaged, the surgical table 100 and/or the drive wheel(s) 600 brakes or stops moving. This arrangement safeguards against unwanted or unintended motion of the surgical table 100 and/or the drive wheel(s) 600, unless the operator is firmly holding the module 508 at the first actuator 512 and engaging one of the second, third, or fourth actuators 514, 516, 517.

When not in use (e.g., when it is desired that the surgical table 100 stay in one location for an extended period of time), the module 508 can be folded or rotated downwardly with respect to a remainder of the first attachment 500. Alternatively, in one embodiment, the module 508 can be separated from a remainder of the first attachment 500. In one embodiment, when the operator desires to move the module 508 from the stowed position (FIG. 14C) to the deployed position (FIG. 14A), the operator can insert at least a portion of his/her hands through one or more spaced-apart openings or cutouts 518 either (i) within the plate 502 or (ii) between the plate 502 and the cross-beam 506 to flip or rotate the module 508 around the one or more brackets or pivot points 520 (see FIGS. 14B and 14C). The module 508 can be moved between the stowed and the deployed configuration in a matter of seconds, and does not significantly add to the overall length of the surgical table 100 in either configuration.

In one embodiment, the first attachment 500 and/or any of the other attachments can operate in conjunction with and/or communicate with a separate hand pendant and/or an auxiliary panel of the surgical table 100. Radio frequency (RF), such as the ZigBee standard, can be used to communicate between the hand pendant, the first attachment 500 and/the auxiliary panel, for example. In one embodiment, the module 508 and/or the first attachment 500 can include an imbedded wireless interface printed circuit assembly (PCA), which can communicates with another, separate PCA in the surgical table 100 while the motion is being commanded by the operator. This technology can allow the hand pendant to give the operator an indication of the state of the drive assist mechanism 700 (such as deployed, enabled, active forward, active backwards) and/or provide battery charge status of the first attachment 500. In such an embodiment, the drive assist wheel 600 is not controlled via the hand pendant; only the module 508 and/or the first attachment 500 can control the drive wheel(s) 600. However, the presently disclosed technology is not limited to such an arrangement or configuration.

When not deployed (e.g., when the magnets 524 are not sensing contact with the end rail 506), no power is consumed by the wireless board. As mentioned above, the module 508 can include one or more batteries 526 (see FIG. 14C) to provide power to the wireless board, the PCB 511, the sensor 510 and/or one or more of the actuators 512, 514, 516, 517. Recharging the batteries 526 can be accomplished via a cable, wire or cord of the detachable hand pendant (which can be stowed in the surgical table 100). In one embodiment, power to the wireless board, the PCB 511, the sensor 510 and/or one or more of the actuators 512, 514, 516, 517 can be available while the cable is connected (in the event that batteries 526 are dead or out of charge).

Thus, the above-described technology, in one embodiment, provides the operator with the ability to drive the surgical table 100 forward and/or backwards, and/or steer with maximum leverage. The first attachment 500 can be installed in and/or at either end (e.g., head or foot end) of the surgical table 100, thereby allowing the operator to drive the surgical table 100 from either end thereof. To facilitate such functionality, the surgical table 100 can automatically sense which end of the surgical table 100 the first attachment 500 is installed in or attached to, and can automatically adjust the forward/reverse directions so they are appropriate to the orientation of the operator. No prior art device allows this total level of ergonomic control.

Referring again to FIGS. 14A-15, free ends of each arm 504a, 504b of the first attachment 500 (e.g., opposite the module 508 and cross-beam 506) can include at least one projection 522a, 522b designed to be received in at least one receptacle or socket of a remainder of (e.g., the upper platform 102) the surgical table 100. The receptacles can be positioned or located in the upper platform 102, for example. Each projection 522a, 522b can include a tab or latch 534a, 534b that can be rotatable about an axis 536 extending generally perpendicularly to a plane defined by the plate 502 of the first attachment 500. At least a portion of each tab 534a, 534b can be configured to engage a portion of an interior of the receptacle. It is understood by those skilled in the art that the above-described arrangement could be reversed (e.g., a receptacle in each arm 504a, 504b receives at least a portion of a projection from a reminder of the surgical table 100) without compromising the functionality described herein.

In embodiment, the surgical table 100 can employ a few different technologies in a few different locations. For example, in one embodiment, the surgical table 100 can employ one or more tri-axis magnetic sensors. These sensors can detect the presence of a magnet, as well as its relative location along an arc. In particular, in one embodiment, one or more permanent magnets 544 (shown schematically in FIG. 15) can be positioned at or about the pivot axis of each gear 528 (described in detail below) on or in the first attachment 500. More particularly, in one embodiment, a metal flange, which can be positioned on a spindle between the respective gear 528 and a hex nut 546, can contain the permanent magnet 544. The tri-axis magnetic sensor(s) can be mounted in the distal end of the back and leg sections of the second and third attachments 800, 900, and positioned close enough to the magnet location so they are capable of (i) detecting the presence of the attachment and (ii) identifying or reading the angle of rotation or the angle at which the attachment is attached. In one embodiment, tri-axial magnetic sensor technology is employed on two or more or even all removable attachments 500, 800, 900, even when module 508 is not installed or in use.

Tri-axial magnetic sensing technology can be employed in or by the projections 522a, 522b and the receptacles to allow the components to be sensed by the surgical table 100. Thus, at least one of receptacles is able to sense (i) the presence of, (ii) engagement with, and/or (iii) the angle of insertion (described in detail below) with respect to the respective the projections 522a, 522b, or vice-versa. One or more permanent magnets can be positioned on the rotatable portion of the first attachment 500 near one or both of the projections 522a, 522b. One or more tri-axial magnetic sensors can be mounted in or on one or more of the receptacles. The tri-axial magnetic sensor(s) can sense the presence and determine the angular position of the permanent magnet(s), and thereby determine the adjustment angle of the attachment 500, as understood by those skilled in the art. This sensing is able to be completed wirelessly, which allows the first attachment 500 to be completely removed and separated from a remainder of the surgical table 100.

Referring to specifically FIG. 15, a free end of each arm 504a, 504b can include a gear-and-prong system. The gear-and-prong system can permit the projection 522a, 522b to be held at a specific angle with respect to the plate 502 and/or be rotated or otherwise moved with respect to the plate 502 and then held at that angle. More particularly, at least a portion of each projection 522a, 522b can be fixed with respect to a gear 528. The gear 528 can include a plurality of spaced-apart teeth extending around an entire circumference thereof. Alternatively, the teeth of the gear 528 can be located on only a portion of the circumference thereof. A prong 530 and a spring 532 can be positioned within a portion of the arm 504a, 504b. The spring 532 can surround at least a portion of the prong 530 and engage the prong 530 to bias the prong 530 to move toward and into engagement with the gear 528. The opposite end of the prong 530 can mate with or be fixedly attached to a bracket 540, which is able to slide with respect to the arm 504a, 504b. An angle adjust/release handle 542 can attach to bracket 540 on either side of the first attachment 500. The operator or user is able to reach under the top surface 502 of the first attachment, grip the angle adjust/release handle 542, and pull. This action can cause the respective prong 530 to disengage from the gear 528. When the operator releases the angle adjust/release handle 542, the springs 532a, 532b cause the prongs 530a, 530b to reengage with the gear 528 and lock into a new position or angle.

As a result of the above combination of features, the top surface 502 of the first attachment 500 can have multiple configurations or positions with respect to the top surface of the upper platform 102. For example, the top surface 502 of the first attachment 500 can extend at an angle (e.g., adjusted upward or downward from zero up to ninety degrees) with respect to the top surface of the upper platform 102, even while the first attachment 500 is secured to the upper platform 102. In another embodiment (not shown), the top surface 502 of the first attachment 500 can extend parallel to, but not necessarily be coplanar with, the top surface of the upper platform 102. For example, in such an embodiment, the upper platform 102 or the first attachment 500 could still allow angular adjustments and the first attachment 500 could still include the drive assist module.

The surgical table 100 is also configured to use radio-frequency identification (RFID), or another identification protocol. As described in more detail below, RFID technology can be employed at the interfaces between upper platform 102 and any of the removable attachments. In one embodiment, RFID technology can be used with the back and leg segments or attachments 800, 900, but also options such as an imaging board. RFID tags are capable of transmitting serialized information, so the system can use RFID tags to determine exactly what is attached in each location. With this technology, the system can also pass a limited amount of power to the distal device to drive sensors. In one embodiment, RFID technology is employed on two or more or even all of the removable attachments 500, 800, 900, even when module 508 is not installed or in use.

Figure 16:
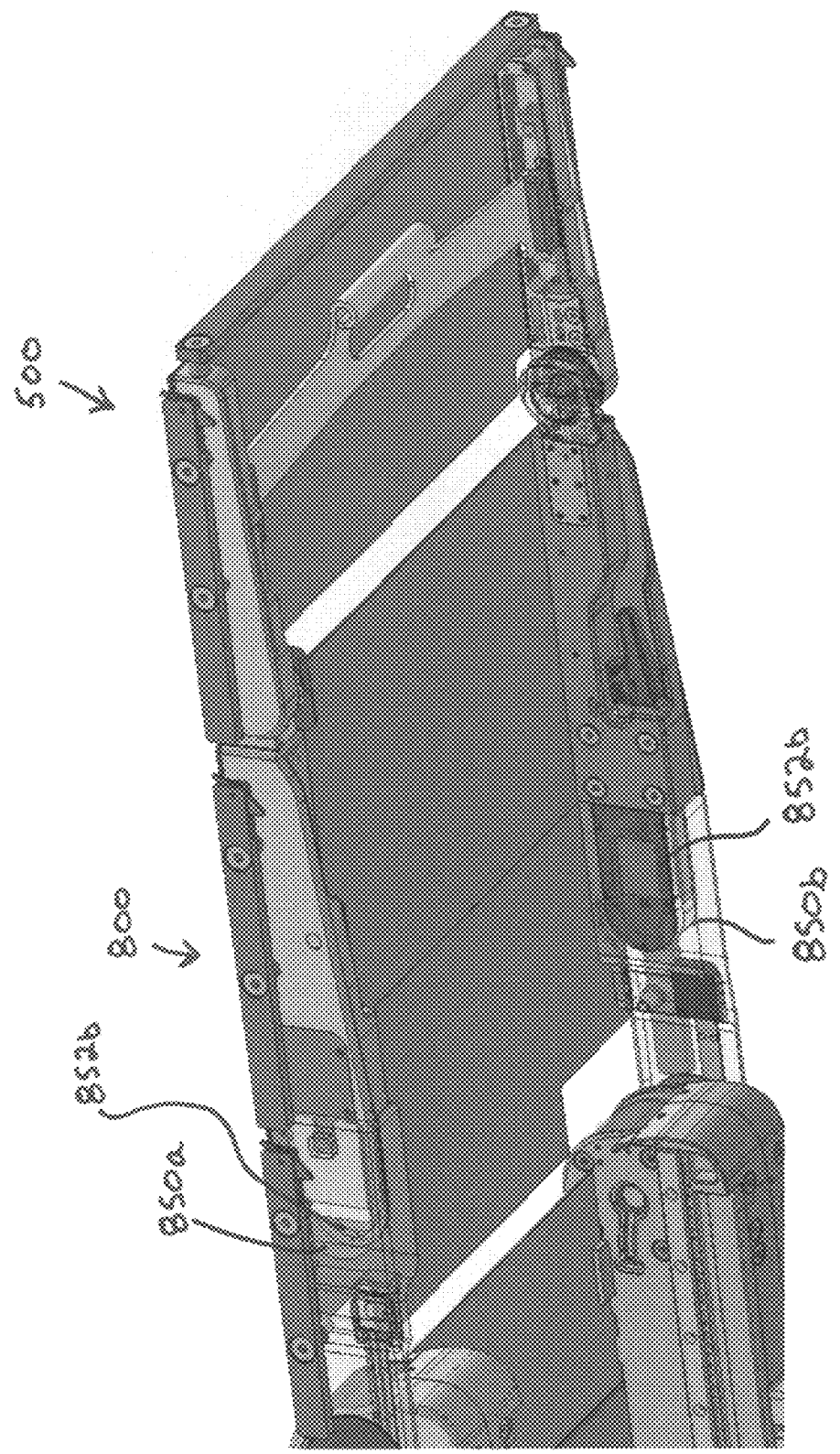
FIG. 16 is a bottom perspective view of at least a portion of the system or apparatus of one embodiment of the present disclosure.
Figure 17:
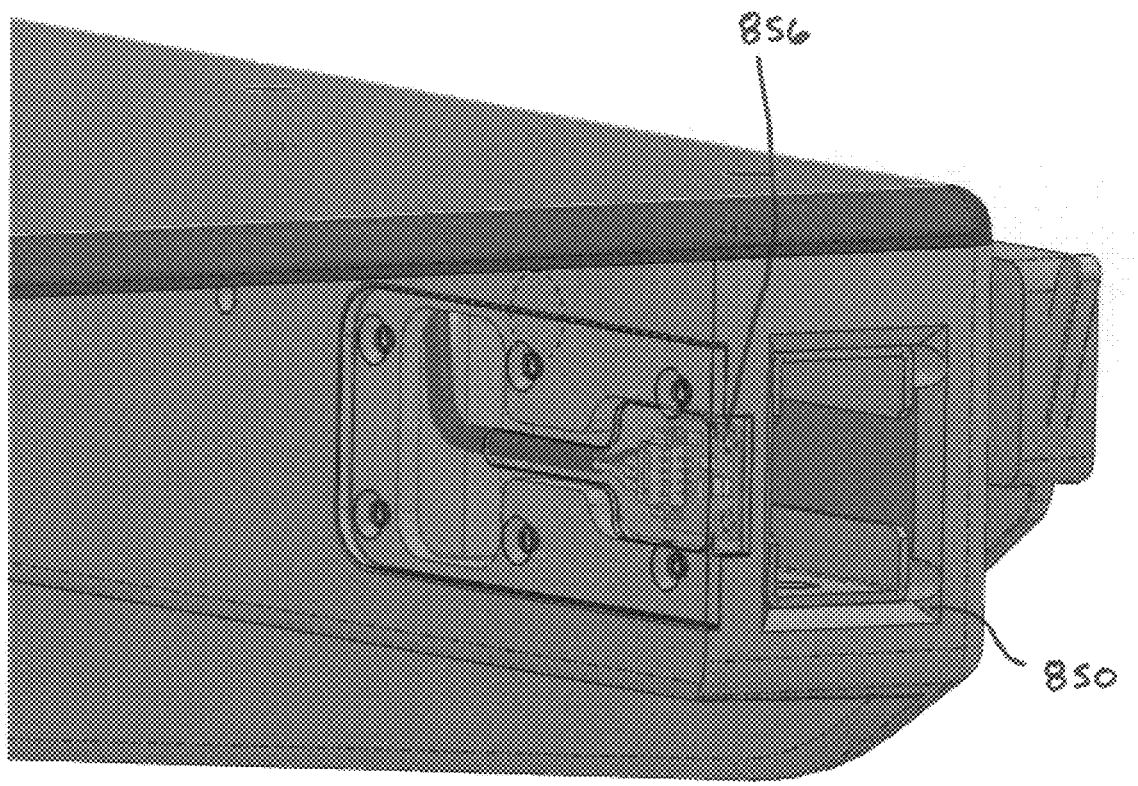
FIG. 17 is a magnified view of a socket or receptacle of one embodiment of the present disclosure.
Figure 18:
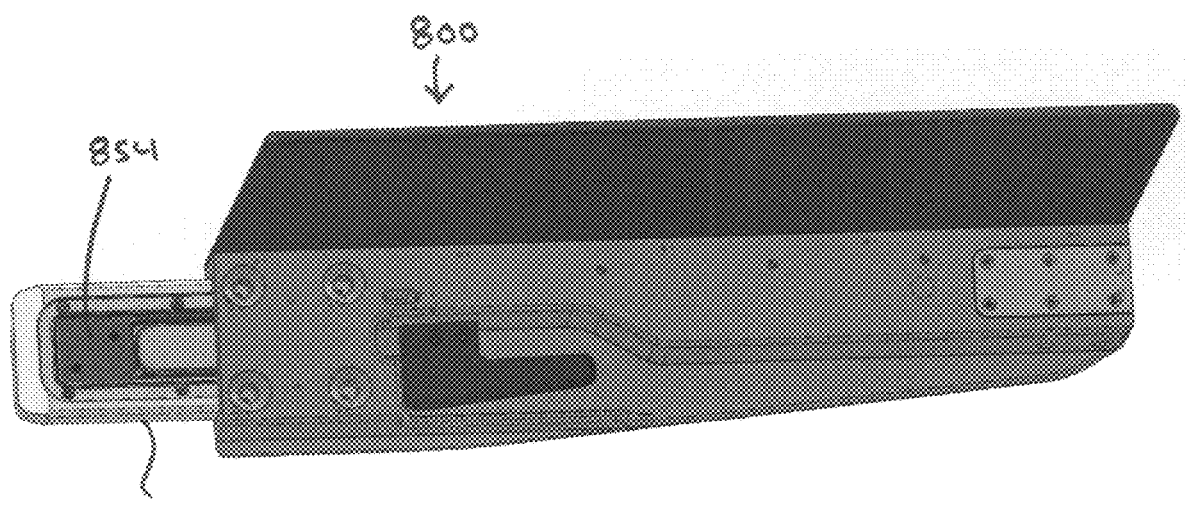
FIG. 18 is a bottom perspective view of a portion of an attachment of one embodiment of the present disclosure, wherein a segment of the attachment is omitted for clarity.
Figure 19:
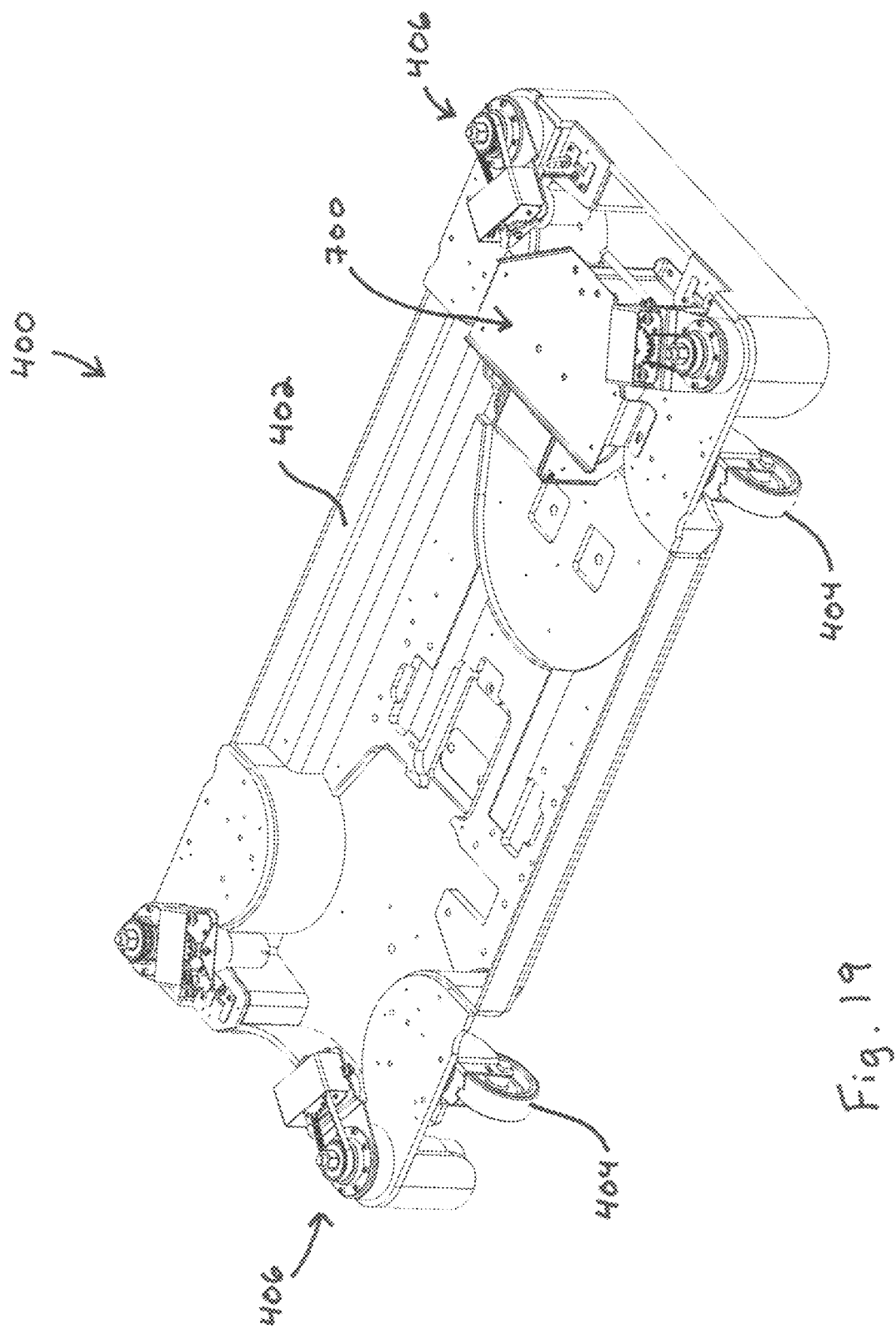
FIG. 19 is a perspective view of at least a portion of a base according to one embodiment of the present disclosure.

Referring to FIGS. 16-18, in one example, the upper platform 102 or another portion of the surgical table 100 can include two or more spaced-apart sockets 850a, 850b. Each socket 850a, 850b can be sized, shaped and/or or configured to receive at least a portion of an extension 852a, 852b of one of the second attachment 800. The RFID technology can allow the respective socket 850 and extension 852 to communicate with each other and/or remaining portions of the surgical table 100. In particular, at least one of sockets 850a, 850b and/or the extensions 852a, 852b is able to sense (i) the presence of, (ii) engagement with, and/or (iii) the angle of insertion.

One or more RFID tags and/or readers can be positioned in or on one or both of the extensions 852a, 852b and/or in or on one or more of the sockets 850a, 850b. The tag(s) and reader(s) can communicate or exchange information, as understood by those skilled in the art. This sensing is able to be completed wirelessly. More particularly, in one embodiment, one or each extension 852a, 852b can include a first or "smart" RFID tag 854, which is capable of transmitting power. Each socket 850a, 850b can include a board or second RFID tag 856. The presently disclosed technology is not limited to the inclusion of "smart" RFID tags, as it could employ "dumb" RFID tags, which do not transmit power.

As understood by those skilled in the art, the presently-disclosed technology provides for intelligent detection of one or more of the attachments. More specifically, due to the use of RFID technology, the surgical table 100 is able to detect not only the presence of an attachment that was not previously attached, but also to identify, specifically, which attachment that is (i.e., the second attachment 800) and the orientation of that component (e.g., the second attachment 800 is being attached at the foot end side of the surgical table 100 and/or the angle of the second attachment 800 with respect to the upper platform 102). Furthermore, the information obtained from the RFID technology can be used to improve the accuracy of a collision detection algorithm. As mentioned above, the RFID technology also transfers power wirelessly, which is one way to energize the tri-axial magnetic sensor. The RFID technology thus allows the surgical table 100 to sense (i) presence and (ii) position of two serial distal segments wirelessly. This is more than simply a proximity sensor, which is only capable of realizing that some component is attached, but not the orientation of that component.

FIGS. 19-24 show details of one embodiment of the base 400 of the presently disclosed technology. The base 400 can be formed of a stage 402 that can accommodate and/or support a plurality of components. The components can include (i) the drive assist mechanism 700 having the one or more drive wheels 600, (ii) three, four or more spaced-apart caster wheels 404, and/or (iii) one, two, four or more spaced-apart load sensing/floor lift mechanisms 406. The stage 402 can include one or more cut-outs or openings 403 (see FIGS. 19-21A) therein that are size, shaped and/or configured to accommodate the drive wheel(s) 600. In one embodiment, each opening 403 be near a head end of the surgical table 100 and centered laterally. In alternative embodiments, each opening 403 and drive wheel 600 could be positioned at or near a center of the stage 403, or the drive wheel 600 could be two wheels out-board of the stage. In one embodiment, each drive wheel 600 does not pivot or castor. However, in another embodiment, each drive wheel 600 includes this functionality.

Figure 21A:
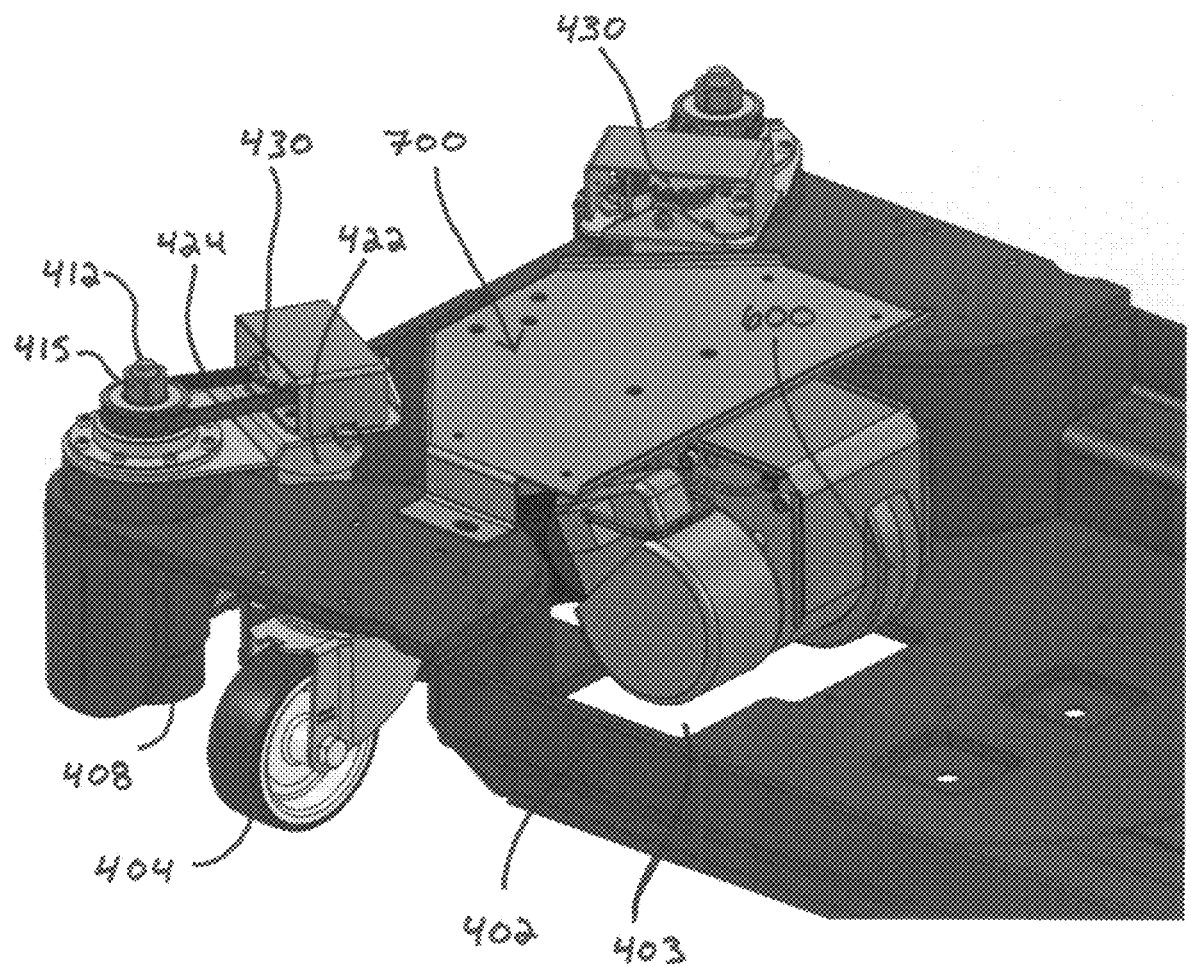
FIG. 21A is a magnified perspective view of a least a portion thereof.
Figure 21B:
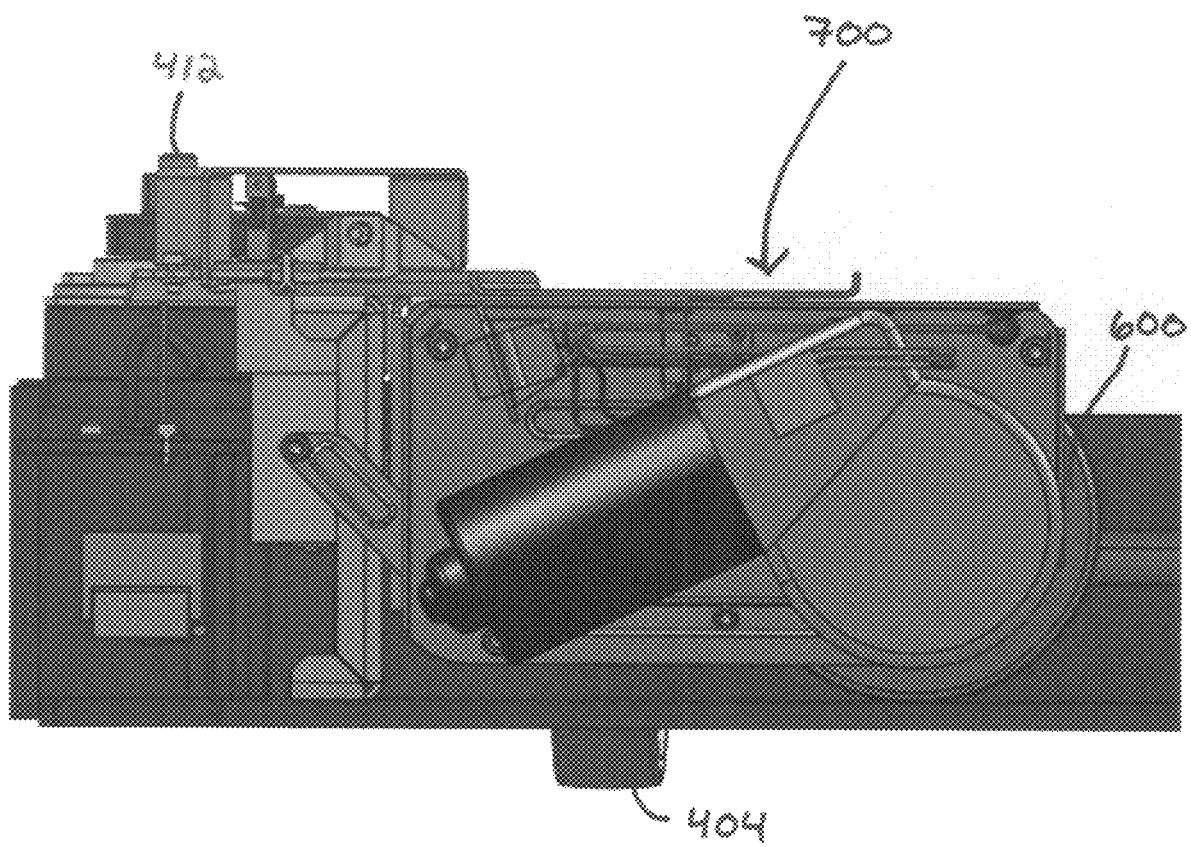
FIG. 21B is a cross-sectional side elevation view of FIG. 21A and showing a drive assist mechanism in an upward or stowed position.
Figure 21C:
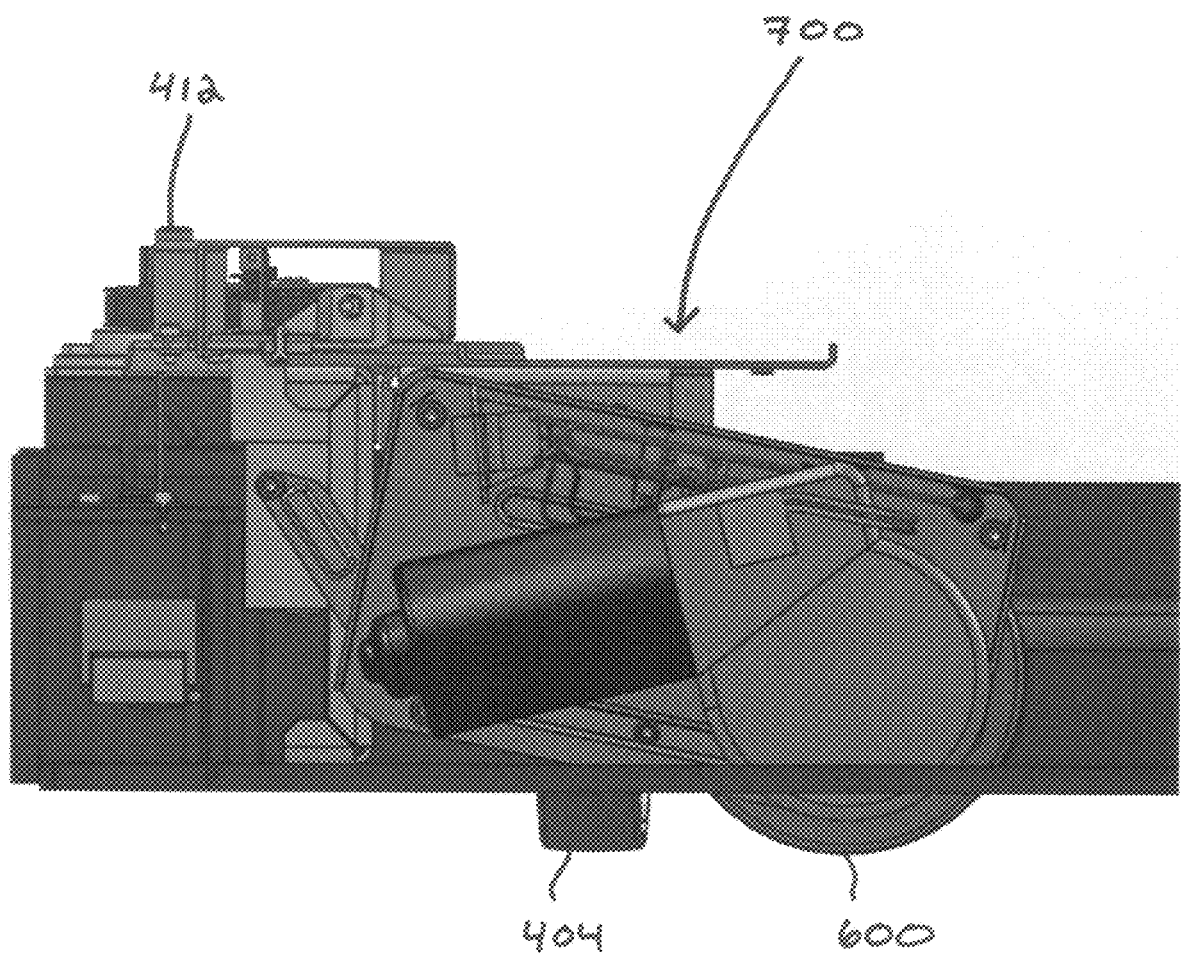
FIG. 21C is a view similar to that of FIG. 21B, but where the drive assist mechanism is shown in a downward position.

As shown in FIGS. 21B and 21C, the drive assist mechanism 700 is capable of moving the drive wheel(s) 600 into and out of engagement with the ground surface 104, so as to permit or prevent the drive wheel(s) 600 from moving the surgical table 100. The drive assist mechanism 700 can include at least one motor, which can be in communication with the module 508, to selectively effectuate this rotation or slight pivot of the drive wheel(s) 600. The drive assist mechanism 700 can employ a spring suspension system. So when the mechanism 700 has moved the drive wheel 600 into the downward or engaged position, even though, in one embodiment, the drive wheel 600 is the fifth wheel contacting the ground surface 104, the spring suspension system always forces the drive wheel(s) 106 downward to make frictional contact with the ground surface 104.

During transport, the surgical table 100 can roll on the caster wheel(s) 404, while at least a portion (e.g., a support foot, described in detail below) of each load sensing/floor lift mechanism 406 can be retracted to a protected position and/or raised off of the ground surface 104. During non-transport conditions, such as surgery or storage, at least a portion of each load sensing/floor lift mechanism 406 can be extended so as to contact the ground surface 104, and at least slightly lift the base 400 off the ground surface 104, thereby preventing the caster wheel(s) 404 from contacting the ground surface 104, and in turn preventing the surgical table 100 to be moved via the caster wheel(s) 404.

Each load sensing/floor lift mechanism 406 can include a support foot 408 with a rubberized bottom surface 410. The bottom surface 410 can provide a high coefficient of friction to the support foot 408, so that the support foot 408 can hold the surgical table 100 securely in place when the support foot 408 is in the extended or lifted position. In operation, when the support foot 408 is actuated, the support foot 408 can move downwardly (e.g., generally perpendicularly to a plane defined by the upper platform 102), first making contact with the ground surface 102. As the support foot 408 is further actuated, the support foot 408 can lift the surgical table 100, and in turn at least slightly lift the respective caster wheel 404 off of the ground surface 104.

Figure 22:
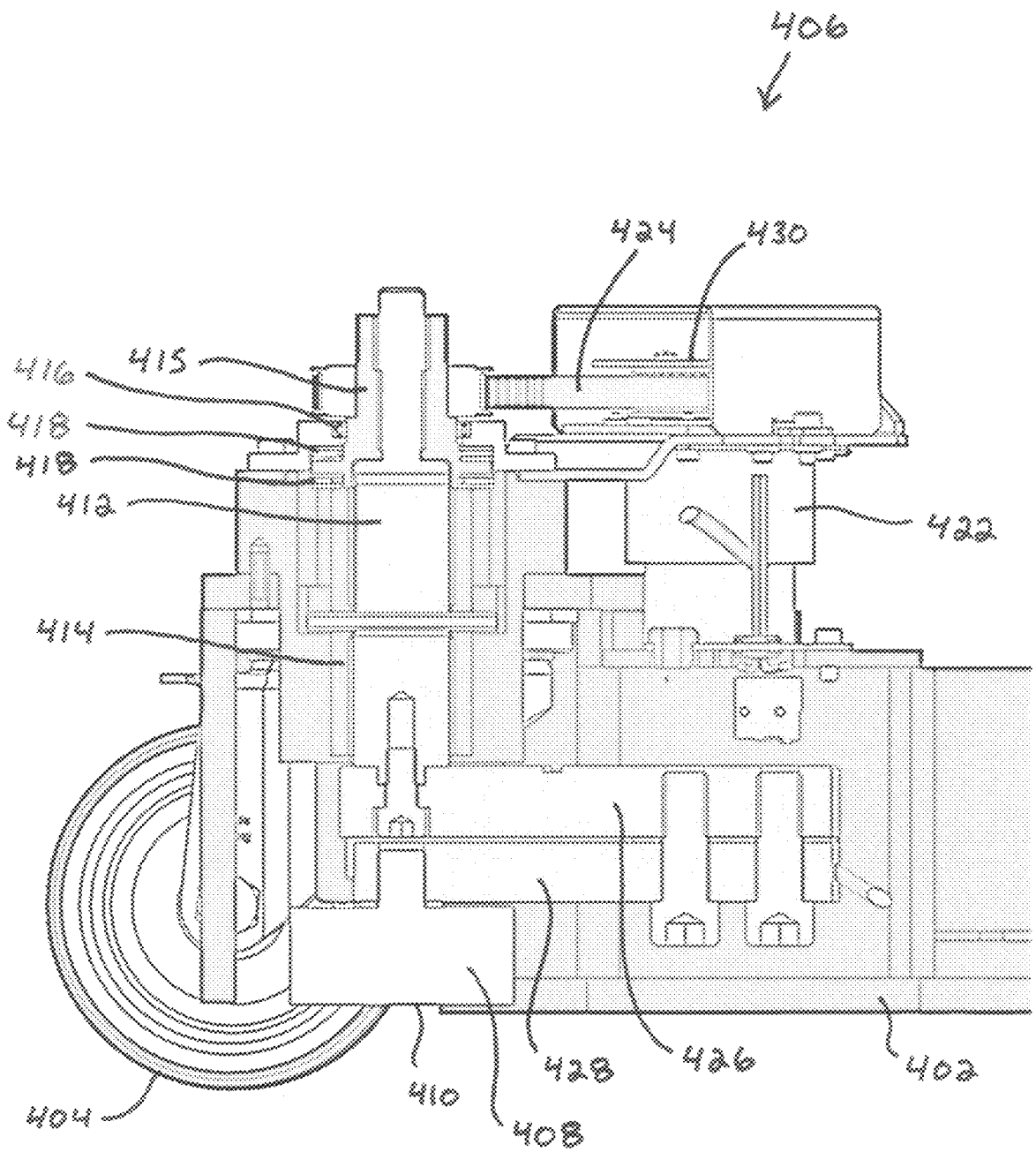
FIG. 22 is a cross-sectional view of at least a portion of a component of the base shown in FIG. 19 taken through a load cell beam, wherein a foot is shown in a retracted position.
Figure 23:
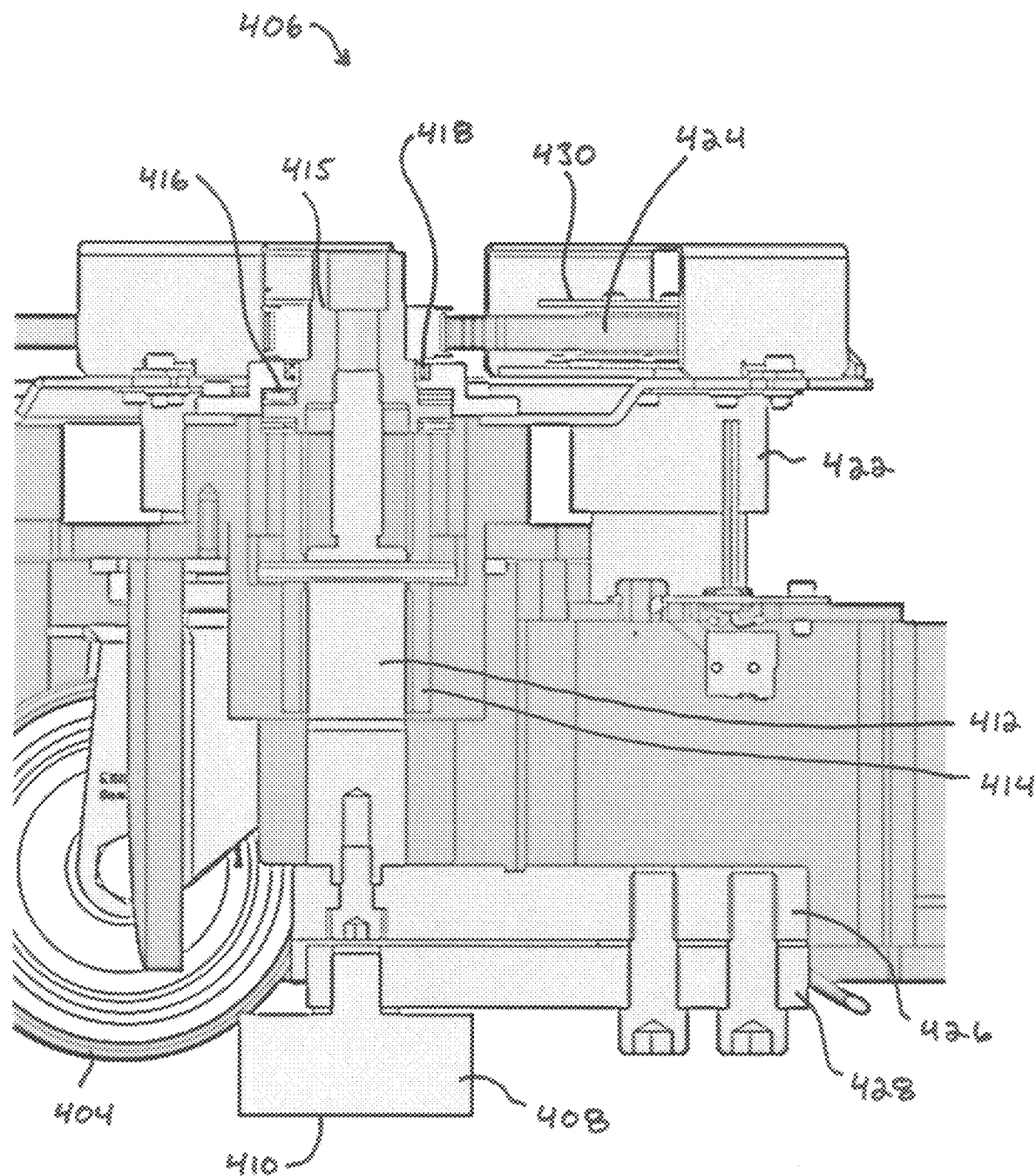
FIG. 23 is another cross-section view of the structure shown in FIG. 22, wherein the foot is shown in an extended position.
Figure 24:
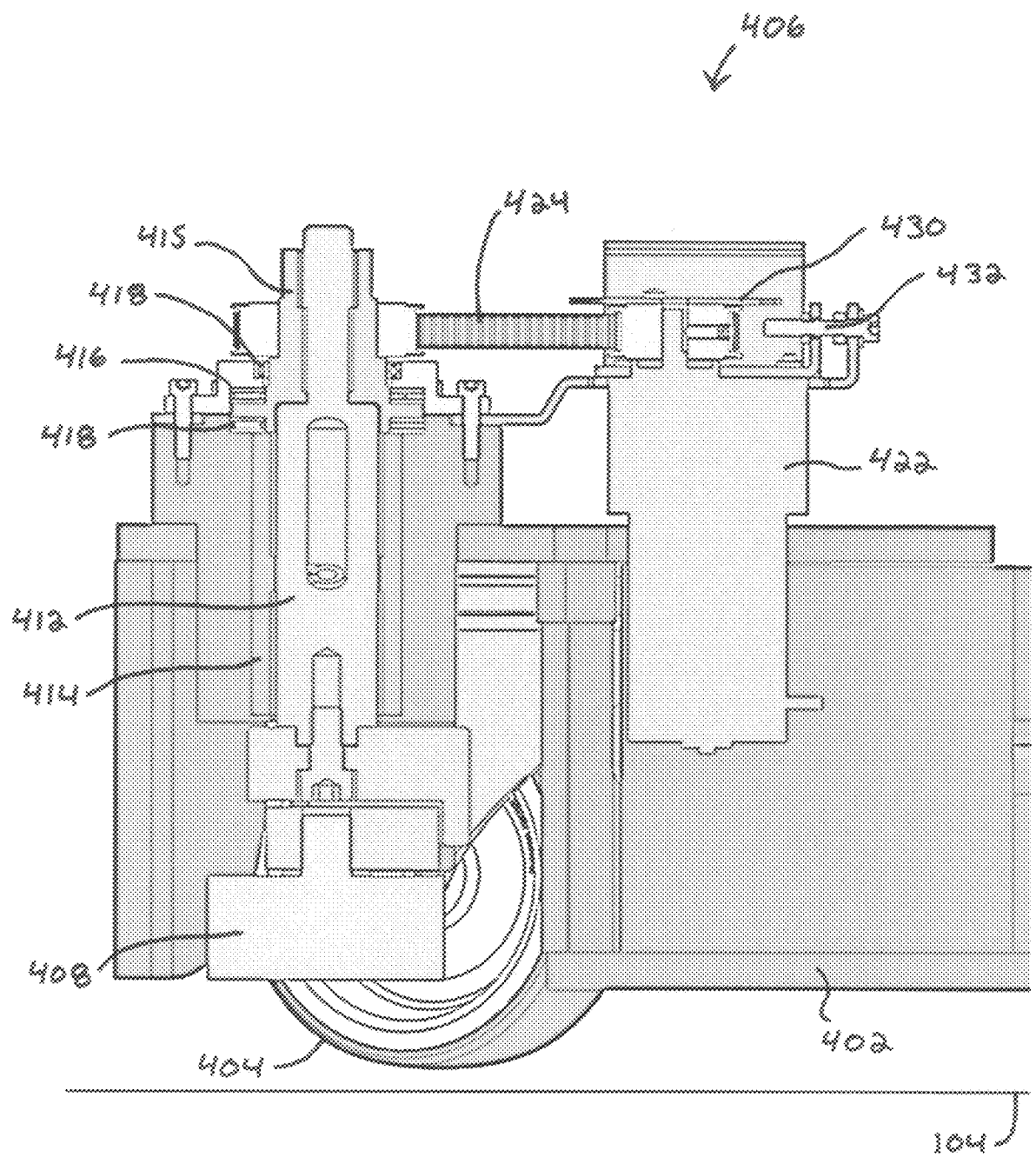
FIG. 24 is a cross-sectional view of at least a portion of a component of the base shown in FIG. 19 taken through a centerline of a drive and driven pulley.

Referring to FIGS. 22-24, each load sensing/floor lift mechanism 406 can include a vertical shaft 412 mounted within a vertical shaft busing 414. An upper end of the shaft 412, which can be threaded, can engage a threaded nut 415. The nut 415 can be contained in a housing by one or more radial bearings 416 and/or one or more thrust bearings 418. In one embodiment, the radial and thrust bearings 416, 418 can allow the nut 415 to rotate about a vertical axis, while all other degrees-of-freedom can be constrained. A transmission device, such as a timing belt pulley or gears, can be attached to the nut 415 and/or the vertical shaft 412. In one embodiment, a motor or gear motor 422 and a drive pulley can be mounted in a parallel axis to the vertical shaft 415 and connected thereto via a timing belt 424 (or gear train). In operation of one embodiment, when the motor 422 is energized, the shaft 412 can be keyed to drive in an upward or downwards direction, but not rotated.

A load cell support beam 426 can be attached to a lower portion of the shaft 412. The load cell support beam 426 can be a passive member that supports a cantilevered load cell beam 428. The support foot 408 can be mounted to the distal end of the load cell beam 428. The load cell beam 428 can include or be operatively connected to one or more sensors, such as strain gages, designed and/or oriented to measure the strain in the load cell beam 428 when vertical forces are applied. With proper calibration, this combination provides an accurate measure of the applied force on the load cell beam 428, and thereby allows the user to know the amount of applied force applied to at least a portion of the surgical table 100.

More particularly, in one embodiment, with four such devices, mounted generally at the (e.g., four) corners of the surgical table 100 and with the surgical table 100 lifted at least slightly off the ground surface 104 due to the extended support feed 408, an accurate reading of weight of the surgical table 100 (including patient and accessories) can be obtained. In addition, since the applied force at each corner of the surgical table 100 is known, the stability of the surgical table 100 can be determined. For example, if at least a portion of the upper platform 102 is extended in the horizontal plane, more weight will be transferred to one end of the base 400, thereby increasing the applied force on two load cell sensors, while simultaneously reducing the force on the other two sensors. A stability algorithm can be applied, which can set a threshold for minimal force necessary to achieve stability during normal operating room procedures (to account for disturbance forces exerted by surgeon or staff).

In one embodiment, as shown in FIGS. 22 and 23, the load cell beam 428 and the load cell support beam 426 can have an identical or nearly identical length, and/or can be aligned such that the shaft 412 and support foot 408 are coaxially aligned. Such an arrangement can serve to eliminate or reduce moment loads being applied to the shaft 412 so the simple bushing 414 can be employed to minimize friction drag. However, such an arrangement is not required for the surgical table 100 and/or the load sensing/floor lift mechanism 406 to function as intended or described herein.

In one embodiment, the lift actuation algorithm can independently and/or separately drive each support foot 408 to the ground surface 104. Each motor 422 can drive its respective support foot 408 downwardly until a predetermined current value is achieved. In one embodiment, this current value can be sufficiently high so as to exceed any expected friction in the drive, but does not generate enough torque to lift the surgical table 100 off of the ground surface 104. In this manner, the position of the ground surface 104 can be independently sensed by each load sensing/floor lift mechanism 406. For example, if a tile of the ground surface 104 is missing in one location, the associated support foot 408 would be driven further than the other three support feet 408. Once all four support feet 408 have found or contacted the ground surface 104, the algorithm can then simultaneously drive all four lift assemblies.

As shown in FIG. 24, an encoder wheel 430 and an optical sensor 432 can be used to drive each support foot 408 a predetermined distance at the same or substantially the same velocity, thereby at least slightly lifting the surgical table 100 to an operative height (e.g., a height in which each of the caster wheels 404 is lifted off the ground surface 104) in a smooth, uniform manner. Upon release, the motor 422 can drive the shaft 412 in the opposite direction until each support foot 408 is fully retracted (e.g., such that each caster wheel 404 contacts the ground surface and causes each support foot 408 to disengage the ground surface 104). The system can be configured to provide feedback (e.g., visual through a monitor, audio through speakers, etc.) to the operator of its position or reposition, or of the load and/or the location of the load applied thereto.

Figure 25:
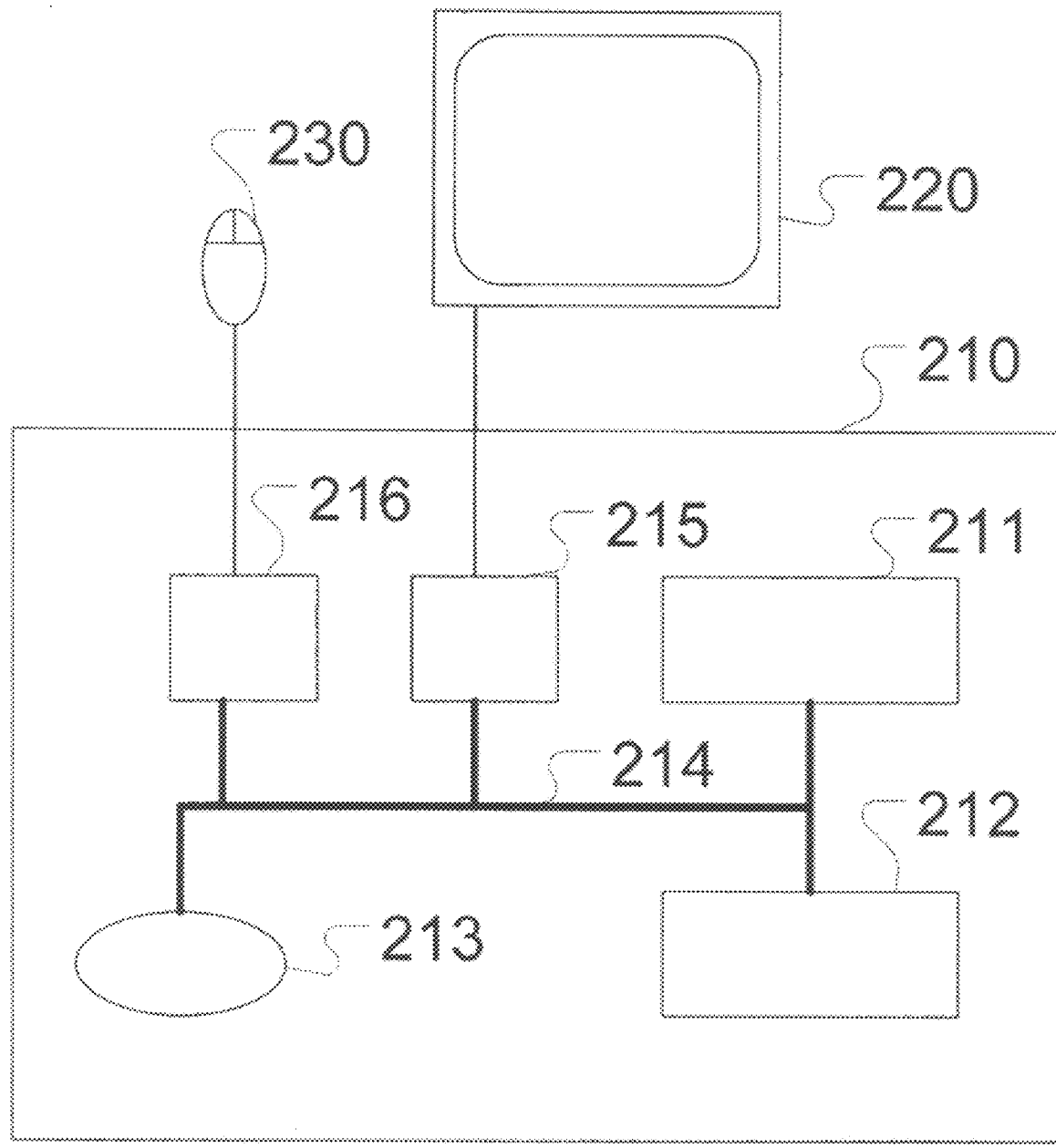
FIG. 25 is a schematic diagram of a computing system of one embodiment of the present disclosure.

One or more of the above-described techniques and/or embodiments may be implemented with or involve software, for example modules executed on one or more computing devices 210 (see FIG. 25). Of course, modules described herein illustrate various functionalities and do not limit the structure or functionality of any embodiments. Rather, the functionality of various modules may be divided differently and performed by more or fewer modules according to various design considerations.

Each computing device 210 may include one or more processing devices 211 designed to process instructions, for example computer readable instructions (i.e., code), stored in a non-transient manner on one or more storage devices 213. By processing instructions, the processing device(s) 211 may perform one or more of the steps and/or functions disclosed herein. Each processing device may be real or virtual. In a multi-processing system, multiple processing units may execute computer-executable instructions to increase processing power. The storage device(s) 213 may be any type of non-transitory storage device (e.g., an optical storage device, a magnetic storage device, a solid state storage device, etc.). The storage device(s) 213 may be removable or non-removable, and may include magnetic disks, magneto-optical disks, magnetic tapes or cassettes, CD-ROMs, CD-RWs, DVDs, BDs, SSDs, or any other medium which can be used to store information. Alternatively, instructions may be stored in one or more remote storage devices, for example storage devices accessed over a network or the internet.

Each computing device 210 additionally may have memory 212, one or more input controllers 216, one or more output controllers 215, and/or one or more communication connections 240. The memory 212 may be volatile memory (e.g., registers, cache, RAM, etc.), non-volatile memory (e.g., ROM, EEPROM, flash memory, etc.), or some combination thereof. In at least one embodiment, the memory 212 may store software implementing described techniques.

An interconnection mechanism 214, such as a bus, controller or network, may operatively couple components of the computing device 210, including the processor(s) 211, the memory 212, the storage device(s) 213, the input controller(s) 216, the output controller(s) 215, the communication connection(s) 240, and any other devices (e.g., network controllers, sound controllers, etc.). The output controller(s) 215 may be operatively coupled (e.g., via a wired or wireless connection) to one or more output devices 220 (e.g., a monitor, a television, a mobile device screen, a touch-display, a printer, a speaker, etc.) in such a fashion that the output controller(s) 215 can transform the display on the display device 220 (e.g., in response to modules executed). The input controller(s) 216 may be operatively coupled (e.g., via a wired or wireless connection) to an input device 230 (e.g., a mouse, a keyboard, a touch-pad, a scroll-ball, a touch-display, a pen, a game controller, a voice input device, a scanning device, a digital camera, etc.) in such a fashion that input can be received from a user.

The communication connection(s) 240 may enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

FIG. 25 illustrates the computing device 210, the output device 220, and the input device 230 as separate devices for ease of identification only. However, the computing device 210, the display device(s) 220, and/or the input device(s) 230 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). The computing device 210 may be one or more servers, for example a farm of networked servers, a clustered server environment, or a cloud services running on remote computing devices.

It will be appreciated by those skilled in the art that changes could be made to the embodiments described above without departing from the broad inventive concept thereof. For example, various mechanical and electrical connection elements and actuators can be used to achieve the disclosed function. It is understood, therefore, that this invention is not limited to the particular embodiments disclosed, but it is intended to cover modifications within the spirit and scope of the present invention as defined by the appended claims.

We claim:

1. A table for supporting a patient, comprising:
   a platform comprising a top surface, a first end, and a second end, the platform configured to support at least a portion of the patient;
   a support column positioned beneath the platform;
   a base positioned beneath a support column and configured to support the support column, the base comprising at least one drive wheel;
   an attachment selectively connectable to either the first end or the second end of the platform of the table to form a segment of the table, the attachment comprising:
      a plate comprising a top surface,
      a cross beam supporting the plate; and
   a drive assist user interface module removably attached to the cross beam of the attachment, the drive assist user interface module operatively connected to the at least one drive wheel, the drive assist user interface module configured for two-handed operation to permit an operator of the system to selectively control movement of the at least one drive wheel and guide movement of the table, the drive assist user interface module comprising:
      a palm grip configured to actuate a capacitive switch when the palm grip is engaged by an operator, and
      a motion control actuator configured to initiate or control motion of the at least one drive wheel, wherein the motion control actuator is configured to only be active when the capacitive switch of the palm grip is actuated,
   wherein the drive assist user interface module is movable between a stowed position and a use position, and the drive wheel is locked so it cannot drive the table when the drive assist user interface module is in the stowed position.

2. The table of claim 1, further comprising one or more additional attachments connected to the platform of the table to form a segment of the table, the attachment and each additional attachment configured to selectively attach to either the first end or the second end of the platform,
   wherein the drive assist user interface module is configured to selectively connect to the one or more additional attachments.

3. The table of claim 1, wherein the motion control actuator comprises a plurality of actuators,
   wherein engagement of one of the actuators causes the drive wheel to rotate in a forward direction, and
   wherein engagement of another one of the actuators causes the drive wheel to rotate in a reverse direction.

4. The table of claim 1, wherein the attachment comprises an opening, and
   wherein, when the palm grip is engaged by a palm of a hand of an operator, the motion control actuator is positioned and configured to be engaged by a finger of the same hand of the operator extending through the opening.

5. The table of claim 1, wherein the attachment comprises an opening, and
   wherein, when the palm grip is engaged by a palm of a hand of an operator, the attachment is positioned and configured to be gripped by one or more fingers of the same hand of the operator extending through the opening.

6. The table of claim 1, wherein the drive assist user interface module comprises one or more connection mechanisms positioned to hold the drive assist user interface module in one or more of the stowed position and the use position, the drive assist user interface module configured to activate when sensing the presence of the one or more connection mechanisms in the use position.

7. The table of claim 1, wherein the drive assist user interface module is configured to stop movement of the table when an operator disengages at least one of the palm grip and the motion control actuator.

8. The table of claim 1, wherein the drive assist user interface module is configured to permit an operator to control the motion control actuator only when the operator grips with two hands the palm grip and the capacitive switch.

9. The table of claim 8, wherein the motion control actuator is configured to be active when the operator grips with two hands the palm grip and the capacitive switch.

10. The table of claim 1, further comprising the plate of the attachment being supported by at least two spaced-apart arms, the cross beam connecting the at least two spaced-apart arms.

11. The table of claim 1, wherein the plate of the attachment is generally co-planar with the platform.

12. The table of claim 1, wherein the drive assist user interface module is one or more of: pivotable relative to the attachment, and removable with respect to at least a portion of the attachment.

13. The table of claim 12, wherein, to move to the use position, the drive assist user interface module is pivotable upward relative to the attachment about an axis extending parallel to the cross beam.

14. The table of claim 1, wherein the base further comprises at least one load-sensing lift mechanism and at least one caster wheel, the at least one load-sensing lift comprising a support foot and a motor, and
   wherein the motor is configured to raise the support foot to permit the caster wheel to contact the ground surface, and the motor is configured to lower the support foot to prevent the caster wheel from contacting the ground surface.

15. The table of claim 1, further comprising a drive assist mechanism comprising the drive wheel and the drive assist user interface module, the drive assist mechanism configured to move the drive wheel between a stowed position and a use position so as to engage and disengage a ground surface.

16. The table of claim 15, further comprising a pendant or auxiliary panel of the table that is separate from the drive assist user interface module, the pendant or panel configured to provide an operator with at least one of a state of the drive assist mechanism or a state of the attachment.

17. The table of claim 1, wherein at least one of the attachment and the drive assist user interface module comprises an embedded first wireless interface circuit configured to communicate with a second circuit in the table while the table is in motion.

18. The table of claim 1, wherein the table is configured to automatically sense which of the first end and the second end of the platform to which the attachment is connected.

19. The table of claim 18, wherein the attachment comprises a magnet, and
wherein each of the first end and the second end comprise a magnetic sensor configured to sense the presence of the attachment at either the first end or the second end by sensing the magnet such that the table is configured to automatically sense which of the first end and the second end of the platform to which the attachment is connected.

20. The table of claim 18, wherein the surgical table is further configured to automatically adjust a forward direction and a reverse direction to orient the attachment relative to the operator.

21. A table for supporting a patient, comprising:
a platform comprising a top surface, a first end, and a second end, the platform configured to support at least a portion of the patient;
a support column positioned beneath the platform;
a base positioned beneath a support column and configured to support the support column, the base comprising at least one drive wheel; and
an attachment selectively connectable to either the first end or the second end of the platform of the table to form a segment of the table, the attachment comprising:
a plate comprising a top surface,
a cross beam supporting the plate, and
an opening; and
a drive assist user interface module removably attached to the cross beam of the attachment, the drive assist user interface module operatively connected to the at least one drive wheel, the drive assist user interface module configured to permit an operator of the system to selectively control movement of the at least one drive wheel and guide movement of the table, the drive assist user interface module comprising:
a first actuator, and
a second actuator configured to initiate or control motion of the at least one drive wheel, wherein the second actuator is configured to only be active when the first actuator is engaged by an operator,
wherein the drive assist user interface module is rotatable relative to the attachment about an axis extending parallel to the cross-beam between a stowed position and a use position, and the drive wheel is locked so it cannot drive the table when the drive assist user interface module is in the stowed position, and
wherein, when the first actuator is engaged by a hand of an operator, the attachment is positioned and configured to be gripped by one or more fingers of the same hand of the operator extending through the opening.

22. The table of claim 21, wherein the drive assist user interface module is configured to permit an operator to control the second actuator only when the operator grips with two hands the first actuator and the second actuator.

23. The table of claim 22, wherein the first actuator comprises a capacitive switch and the second actuator comprises a motion control actuator.

24. The table of claim 21, further comprising the plate of the attachment being supported by at least two spaced-apart arms, the cross beam connecting the at least two spaced-apart arms.

25. The table of claim 21, wherein the drive assist user interface module is removable with respect to at least a portion of the attachment.

26. The table of claim 21, wherein the table is configured to automatically sense which of the first end and the second end of the platform to which the attachment is connected.

27. The table of claim 26, wherein the attachment comprises a magnet, and
wherein each of the first end and the second end comprise a magnetic sensor configured to sense the presence of the attachment at either the first end or the second end by sensing the magnet such that the table is configured to automatically sense which of the first end or the second end of the platform to which the attachment is connected.

28. The table of claim 26, wherein the surgical table is further configured to automatically adjust a forward direction and a reverse direction to orient the attachment relative to the operator.

29. A table for supporting a patient, comprising:
a platform comprising a top surface, a first end, and a second end, the platform configured to support at least a portion of the patient;
a support column positioned beneath the platform;
a base positioned beneath a support column and configured to support the support column, the base comprising at least one drive wheel;
a drive assist user interface module removably attached to the attachment and comprising a first actuator, the drive assist user interface module operatively connected to the at least one drive wheel, the drive assist user interface module configured to permit an operator of the system to selectively control movement of the at least one drive wheel and guide movement of the table;
an attachment selectively connectable to one of the first end and the second end of the platform of the table to form a segment of the table, the table configured to automatically sense which of the first end and the second end of the platform to which the attachment and the drive assist user interface module are connected,
wherein, when the first actuator is engaged by a hand of an operator, the attachment is positioned and configured to be gripped by one or more fingers of the same hand of the operator extending through an opening of the attachment.

30. The table of claim 29, wherein the surgical table is further configured to automatically adjust a forward direction and a reverse direction based on which of the first end and the second end of the platform to which the attachment is connected.

31. The table of claim 29, wherein the drive assist user interface module further comprises a second actuator configured to initiate or control motion of the at least one drive wheel, the second actuator configured to be active only when the first actuator is engaged by an operator.

32. The table of claim 31, wherein the drive assist user interface module is rotatable relative to the attachment between a stowed position and a use position, the drive wheel being locked so it cannot drive the table when the drive assist user interface module is in the stowed position.

33. The table of claim 29, wherein each of the first end and the second end of the platform comprises a socket, and
   wherein the attachment comprises a projection configured to be received by the socket of either the first end or the second end to connect to either the first end or the second end.

34. The table of claim 33, wherein the projection comprises a magnet, and
   wherein the socket of each of the first end and the second end comprise a magnetic sensor configured to sense the presence of the attachment at either the first end or the second end by sensing the magnet such that the table is configured to automatically sense which of the first end or the second end of the platform to which the attachment is connected.

* * * * *